(12) United States Patent
Wood et al.

(10) Patent No.: US 8,105,652 B2
(45) Date of Patent: *Jan. 31, 2012

(54) METHODS OF MAKING DECOMPOSABLE THIN FILMS OF POLYELECTROLYTES AND USES THEREOF

(75) Inventors: Kris C. Wood, Cambridge, MA (US); Helen F. Chuang, Cambridge, MA (US); Robert D. Batten, Princeton, NJ (US); David M. Lynn, Middleton, WI (US); Paula T. Hammond Cunningham, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 999 days.

This patent is subject to a terminal disclaimer.

(21) Appl. No.: 11/459,979

(22) Filed: Jul. 26, 2006

(65) Prior Publication Data

US 2007/0020469 A1 Jan. 25, 2007

Related U.S. Application Data

(63) Continuation-in-part of application No. 10/280,268, filed on Oct. 24, 2002, now Pat. No. 7,112,361.

(60) Provisional application No. 60/809,640, filed on May 30, 2006.

(51) Int. Cl.
*B32B 7/02* (2006.01)
*A61F 2/00* (2006.01)
*A61K 9/00* (2006.01)
*A61K 9/52* (2006.01)

(52) U.S. Cl. ...... 427/331; 428/212; 428/402; 428/402.2; 428/402.21; 428/402.22; 428/402.24; 428/430; 428/480; 428/483; 428/702; 428/426; 428/446; 428/454; 428/457; 427/2.1; 427/212; 427/214; 427/340; 427/407.1; 424/426; 424/443; 424/484; 424/489; 424/78.08

(58) Field of Classification Search .................. None
See application file for complete search history.

(56) References Cited

U.S. PATENT DOCUMENTS

| 3,710,795 | A | * | 1/1973 | Higuchi et al. | 424/424 |
|---|---|---|---|---|---|
| 3,962,414 | A | * | 6/1976 | Michaels | 424/473 |
| 4,191,811 | A | | 3/1980 | Hodgdon | |
| 4,250,029 | A | | 2/1981 | Kiser | |
| 5,114,719 | A | * | 5/1992 | Sabel et al. | 424/422 |
| 5,208,111 | A | | 5/1993 | Decher et al. | |
| 5,364,634 | A | | 11/1994 | Lew | |
| 5,462,990 | A | | 10/1995 | Hubbell | |

(Continued)

FOREIGN PATENT DOCUMENTS

DE 19812083 9/1999

(Continued)

OTHER PUBLICATIONS

Anderson, "Human Gene Therapy" Nature, 392: 25-30, 1996.

(Continued)

*Primary Examiner* — Vivian Chen
(74) *Attorney, Agent, or Firm* — Choate, Hall & Stewart, LLP; Brenda Herschbach Jarrell

(57) ABSTRACT

A decomposable thin film comprising a plurality of polyelectrolyte layers of alternating charge, wherein decomposition of the thin film is characterized by degradation of at least a portion of the polyelectrolyte layers.

27 Claims, 23 Drawing Sheets

U.S. PATENT DOCUMENTS

| | | | |
|---|---|---|---|
| 5,518,767 A | 5/1996 | Rubner | |
| 5,536,573 A | 7/1996 | Rubner et al. | |
| 5,630,941 A | 5/1997 | Burger | |
| 5,700,559 A | 12/1997 | Sheu | |
| 5,716,709 A | 2/1998 | Ferguson | |
| 5,807,636 A | 9/1998 | Sheu | |
| 5,837,377 A * | 11/1998 | Sheu et al. | 428/412 |
| 5,858,746 A | 1/1999 | Hubbell | |
| 5,904,927 A * | 5/1999 | Amiji | 424/422 |
| 5,962,520 A | 10/1999 | Smith | |
| 6,022,590 A | 2/2000 | Ferguson | |
| 6,060,582 A | 5/2000 | Hubbell | |
| 6,114,099 A | 9/2000 | Liu | |
| 6,312,727 B1 * | 11/2001 | Schacht et al. | 424/490 |
| 6,402,918 B1 | 6/2002 | Schlenoff | |
| 6,447,887 B1 | 9/2002 | Claus et al. | |
| 6,451,871 B1 | 9/2002 | Winterton | |
| 6,479,146 B1 * | 11/2002 | Caruso et al. | 428/403 |
| 6,492,096 B1 | 12/2002 | Liu et al. | |
| 6,497,729 B1 * | 12/2002 | Moussy et al. | 623/23.57 |
| 6,699,501 B1 | 3/2004 | Neu et al. | |
| 6,743,521 B2 * | 6/2004 | Hubbell et al. | 428/500 |
| 6,833,192 B1 * | 12/2004 | Caruso et al. | 428/403 |
| 6,860,980 B2 | 3/2005 | Locascio et al. | |
| 6,919,373 B1 * | 7/2005 | Lam et al. | 514/532 |
| 7,045,087 B2 * | 5/2006 | Kotov | 264/255 |
| 7,045,146 B2 * | 5/2006 | Caruso et al. | 424/463 |
| 7,101,575 B2 * | 9/2006 | Donath et al. | 424/489 |
| 7,101,947 B2 * | 9/2006 | Schlenoff et al. | 526/348.1 |
| 7,112,361 B2 * | 9/2006 | Lynn et al. | 428/212 |
| 7,223,327 B2 * | 5/2007 | Schlenoff et al. | 204/633 |
| 7,348,399 B2 * | 3/2008 | Haynie | 530/300 |
| 7,364,585 B2 * | 4/2008 | Weber | 623/1.15 |
| 7,365,142 B2 | 4/2008 | Schlenoff et al. | |
| 7,491,263 B2 * | 2/2009 | Wang et al. | 96/108 |
| 2002/0053514 A1 | 5/2002 | Locascio | |
| 2002/0131951 A1 | 9/2002 | Langer | |
| 2002/0187197 A1 | 12/2002 | Caruso | |
| 2003/0059398 A1 * | 3/2003 | Ranger et al. | 424/78.08 |
| 2003/0124368 A1 | 7/2003 | Lynn et al. | |
| 2004/0044100 A1 | 3/2004 | Schlenoff | |
| 2004/0149572 A1 | 8/2004 | Schlenoff | |
| 2005/0152955 A1 * | 7/2005 | Akhave et al. | 424/445 |
| 2009/0088479 A1 * | 4/2009 | Allmendinger et al. | 514/616 |
| 2009/0170179 A1 * | 7/2009 | Lynn et al. | 435/180 |
| 2009/0258045 A1 * | 10/2009 | Chuang et al. | 424/409 |

FOREIGN PATENT DOCUMENTS

| | | |
|---|---|---|
| EP | 1 116 516 A1 | 7/2001 |
| EP | 1116516 | 7/2001 |
| GB | 1213803 | 11/1970 |
| GB | 1213805 | 11/1970 |
| WO | 96/03147 | 2/1996 |
| WO | WO 96/03147 | 2/1996 |
| WO | 98/47948 | 10/1998 |
| WO | WO 98/47948 | 10/1998 |
| WO | 99/47253 | 9/1999 |
| WO | WO 99/47253 | 9/1999 |
| WO | 00/77281 | 12/2000 |
| WO | WO 00/77281 | 12/2000 |
| WO | WO 01/57118 A2 | 8/2001 |
| WO | WO 01/94441 | 12/2001 |
| WO | WO 02/085500 | * 10/2002 |

OTHER PUBLICATIONS

Anderson, et al., "Biodegradation and Biocompatibility of PLA and PLGA Microspheres" Adv. Drug Delivery Rev. 28: 5-24, 1997.

Ando, et al., "PLGA Micospheres Containing Plasmid DNA: Preservation of Supercoiled DNA via Cryopreparation and Carbohydrate Stabilization" J. Pharm. Sci. 88: 126-130, 1999.

Antipov, et al., "Sustained Release Properties of Polyelectrolyte Multilayer Capsules" J. Phys. Chem. B 2001, 105, 2281-84.

Barrera, et al., "Synthesis and RGD Peptide Modification of a New Biodegradable Copolymer: Poly (lactic acid-co-lysine)" J. Am. Chem. Soc. 115:11010-11011, 1993.

Bass, "RNA Interference: The Short Answer," Nature 411, 428-29, 2001.

Behr, "Synthetic Gene-Transfer Vectors" Acc. Chem. Res. 26: 274-278, 1993.

Behr, "The Proton Sponge: a Trick to Enter Cells the Viruses Did Not Expoit" Chimia, 51: 34-36, 1997.

Boussif, et al., "A Versatile Vector for Gene and Oligonucleotide Transfer into Cells in Culture and in Vivo: Polyethylenimine" Proc. Natl. Acad. Sci, USA, 92: 7297-7301, 1995.

Brazeau, et al., "In Vitro Myotoxicity of Selected Cationic Macromolecules Used in Non-Viral Gene Delivery" Pharm. Res. 15: 680-684, 1998.

Choksakulnimitr et al., "In Vitro Cytotoxicity of Macromolecules in Different Cell Culture Systems" Controlled Release, 34: 233-241, 1995.

Cotten, et al., "Receptor-Mediated Transport of DNA into Eukaryotic Cells" Methods Enzym. 217: 618, 1993.

Crystal, "Transfer of Genes to Humans: Early Lessons and Obstacles to Success"Science, 270: 404-410, 1995.

Danusso, et al., "Synthesis of Tertiary Amine Polymers" Polymer, 11:88-113, 1970.

Decher, "Fuzzy Nanoassemblies: Toward Layered Polymeric Multicomposites" Science, 277, Aug. 29, 1997, p. 1232-37.

Demeneix, et al., In Artificial Self-Assembling Systems for Gene Delivery (Felgner, et al., Eds). American Chemical Society, Washington, D.C., 1996, 146-151.

Deshmukh, et al., "Liposome and Polylysine Mediated Gene Transfer" New J. Chem. 21: 113-124, 1997.

Dubas, et al., Polyelectrolyte Multilayers Containing a Weak Polyacid: Construction and Deconstruction, Macromolecules 2001, 34, 3736-40.

Dubas, et al., "Multiple Membranes form 'True' Polyelectrolyte Multilayers" J. Am. Chem. Soc. 2001, 123, 5368-69.

Elbert et al., "Self-assembly and steric stabilization at heterogeneous, biological surfaces using absorbing block copolymers" Chemistry & Biology vol. 5, No. 3 1998 pp. 177-183.

Ferruti, et al., "Linear Amino Polymers: Synthesis, Protonation and Complex Formation" Advances in Polymer Science, 58: 55-92, 1984.

Ferruti, et al., "Synthesis, Physico-Chemical Properties and Biomedical Applications of Poly(amino-amine)s" Polymer, 26: 1336, 1985.

Ferruti, et al., "Recent Results on Functional Polymers and Macromonomers of Interest as Biomaterials or for Biomaterial Modifcation" Biomaterials, 15: 1235-1241, 1994.

Ferruti, et al., "Synthesis, Characterisation and Antitumour Activity of Platinum (II) Complexes of Novel Functionalised Poly (Amido Amine)s" Macromol. Chem. Phys. 200: 1644-1654, 1999.

Ferutti, et al., "Amphoteric Linear Poly(amido-amine)s as Endosomolytic Polymers: Correlation between Physicochemical and Biological Properties," Macromolecules, 2000.

Fire, et al., "Potent and Specific Genetic Interference by Double-Stranded RNA in Caenorhabditis Elegans" Nature, 391: 806-811, 1998.

Friedman, "Human Gene Therapy—An Immature Genie, But Certainly out of the Bottle" Nature Med, 2: 144-147, 1996.

Gerasimov, et al., "Cytosolic Drug Delivery Using pH- and Light-Sensitive Liposomes" Adv. Drug Delivery Rev. 38: 317-338, 1999.

Gonzalez, et al., "New Class of Polymers for the Delivery of Macromolecular Therapeutics" Bioconjugate Chem. 10: 1068-1074, 1999.

Haensler, et al., "Polyamidoamine Cascade Polymers Mediate Efficient Transfection of Cells in Culture" Bioconjugate Chem. 4:372-379, 1993.

Hanes, et al., "New Advances in Microsphere-Based Single-Dose Vaccines" Adv. Drug Delivery Rev. 28: 97-119, 1997.

Hansen, et al., "Re-Examination and Further Development of a Precise and Rapid Dye Method for Measuring Cell Growth/Cell Kill" Immunol. Methods, 119:203-210, 1989.

Hill, et al., "In Vitro Cytotoxicity of Poly(amidoamine)s: Relevance to DNA Delivery" Biochim. Biophys. Acta, 1427: 161-174, 1999.

Hope, et al., Cationic Lipids, Phosphatidylethanolamine and the Intracellular Delivery of Polymeric, Nucleic Acid-Based Drugs (Review), Molecular Membrane Technology, 15: 1-14, 1998.

Kabanov, et al., "DNA Complexes with Polycations for the Delivery of Genetic Material inot Cells" Bioconjugate Chem. 6:7-20, 1995.
Kaprnha, "Camopacwennriowhecr Boropactbophmbie nohorehhsie Porhmepbi" Bblcokomorekynrphbie Coeonhehnr 6 1139-44, 19886 (abstract translated into English).
Kargina, et al., "Self-Splitted Water-Soluble Ionogenic Polymers" Vysokomol. Soedin. Seriya A, 28: 1139-1144, 1986.
Kukowska-Latallo, et al., "Efficient Transfer of Genetic Material into Mammalian Cells Using Starburst Polyamidoamine Dendrimers" Proc. Natl. Acad. Sci. USA, 93: 4897-4902, 1996.
Kwon, et al., "Pseudopoly (Amino Acids): A Study of the Synthesis and Characterization of Poly(trans-4-hydroxy-N-acyl-L-proline esters)" Macromolecules, 22: 3250-3255, 1989.
Lim, et al., "A Self-Destroying Polycationic Polymer: Biodegradable Poly(4-Hydroxy-L-Proline Ester)" J. Am. Chem. Soc. 121: 5633-5639, 1999.
Lim, et al., "Development of a Safe Gene Delivery System Using Biodegradable Polymer, Poly [alpha-(4-Aminobutyl-L-Glycolic Acid]" J. Am. Chem. Soc. 122: 6524-6525, 2000.
Lim, et al., "Cationic Hyperbranched Poly(amino ester): A Novel Class of DNA Condensing Molecule with Catioic Surface, Biodegradable Three-Dimensional Structure, and Tertiary Amine Groups in the Interior" J. Am. Chem. Soc. 2001, 123, 2460-61.
Linhardt, et al., "Free-Radical Synthesis of Poly(2-Ethylacrylic Acid) Fractions of Low Polydispersity: Effects of Molecular Weight and Polydispersity on the pH-Dependent Conformational Transition in Aqueous Solution" Macromolecules, 32: 4457-4459, 1999.
Linhardt, et al., "pH-Induced Fusion and Lysis of Phosphatidylcholine Vesicles by Hydrophobic Polyelectrolyte Poly(2-ethylacrylic Acid)" Langmuir, 16: 122-127, 2000.
Luo, et al., "Synthetic DNA Delivery Systems" Nat. Biotechnol. 18: 33-37, 2000.
Lynn, et al., "Degradable Poly(beta-Amino Esters): Synthesis, Characterization, and Self-Assembly with Plasmid DNA." Journal of the American Chemical Society 2000, 122, 10761-10768.
Lynn, et al., "Accelerated Discovery of Synthetic Transfection Vectors: Parallel Synthesis and Screening of a Degradable Polymer Library." Journal of the American Chemical Society 2001, 123, 8155-8156.
Lynn et al., "pH-Responsive Polymer Microspheres: Rapid Release of Encapsulated Material Within the Range of Intracellular pH." Angewandte Chemie International Edition 2001, 40, 1707-1710.
Lynn, et al., Construction of Degradable Thin Films via Layber-by-Layer Deposition of Polyelectrolytes: Fabrication, Characterization, and Application to Controlled Release, MIT Proposal 2001.
Mathiowitz, et al., "Polyanhydride Microspheres as Drug Carriers I. Hot-Melt Microencapsulation" J. Controlled Release, 5:13-22, 1987.
Mathiowitz, et al., "Polyanhydride Microspheres as Drug Carriers. II. Microencapsulation" J. Appl. Polymer Sci., 35: 755-774, 1988.
Michel, et al., "Printing meets lithography: Soft approaches to high-resolution patterning" IBM Journal of Research and Development, vol. 45, No. 5, 2001 697-719.
Miller, "Cationic Liposomes for Gene Therapy" Angew. Chem. Int. Ed. 37: 1769-1785, 1998.
Mulligan, "The Basic Science of Gene Therapy" Science, 260: 926-932, 1993.
Murphy, et al., "A Combinatorial Approach to the Delivery of Efficient Cationic Peptoid Reagents for Gene Delivery", Proc. Natl. Acad. Sci. USA, 95: 1517-1522, 1998.
O'Donnell, et al., "Preparation of Microspheres by the Solvent Evaporation Technique" Adv. Drug Delivery Rev., 28:25-42, 1997.
Okada, "One-and Three- Month Release Injectable Microspheres of the LH-RH Superagonist Leuprorelin Acetate" Adv. Drug Delivery Rev. 28: 43-70, 1997.
Putnam, et al., "Poly(4-hydroxy-L-proline ester): Low-Temperature Polycondensation and Plasmid" Macromoleules 32: 3658-3662, 1999.
Qiu, et al., "Studies on the Drug Release Properties of Polysaccharide Multilayers Encapsulated Ibuprofen Microparticles" Langmuir 17, 2001 5375-5380.
Rao, et al., "Poly (Butaneodiol Spermate): A Hydrolytically Labile Polyester-Based Nitric Oxide Carrier" J. Bioactive and Compatible Polymers 14: 54-63, 1999.
Roberts, et al., "Preliminary Biological Evaluation of Polyamidoamine (PAMAM) StarburstTM Dendrimers" J. Biomed. Mater. Res. 30: 53-65, 1996.
Sanford, "The Biolistic Process" Trends Biotechnol. 6:288-302, 1988.
Schaffer, et al., "Vector Unpacking as a Potential Barrier for Receptor-Mediated Polyplex Gene Delivery" Biotechnol. Bioeng.67: 598-606, 2000.
Schuler "Decomposable Hollow Biopolymer-Based Capsules" Biomacromolecules, vol. 2, 2001 921-26.
Schweikl, et al., "Triethylene Glycol Dimethacrylate Induces Large Deletions in the Hprt Gene of V79 Cells" Mutat. Res. 438: P71:P78, 1999.
Singh, et al., "Cationic Microparticles: A Potent Delivery System for DNA Vaccines" Proc. Natl. Acad. Sci. USA, 97: 811-816, 2000.
Tang, et al., "In Vitro Gene Delivery by Degraded Polyamidoamine Dendrimers" Bioconjugate Chem. 7:703-714, 1996.
Uhrich, "Hyperbranched Polymers for Drug Delivery" Trends Polym. Sci. 5: 388-393, 1997.
van de Wetering, et al., "Structure-Activity Relationships of Water-Soluble Cationic Methacrylate/Methacrylamide Polymers for Nonviral Gene Delivery" Bioconjugate Chem. 10: 589-597, 1999.
Wang et al., "A Novel Biodegradable Gene Carrier Based on Polyphosphoester" J. Am Chem. Soc. 2001, 123 9480-81.
Yang, et al., "A New Approach to Identifying Genotoxic Carcinogens: p53 Induction as an Indicator of Genotoxic Damage" Carcinogenesis, 19: P1117-P1125, 1998.
Zauner, et al., "Polylysine-Based Transfection Systems Utilizing Receptor-Mediated Delivery" Adv. Drug. Del. Rev. 30: 97-113, 1998.
Zhou, et al., "Preparation of Poly(L-serine ester): A Structural Analogue of Conventional Poly(L-serine)" Macromolecules, 23: 3399-3406, 1990.
Search Report for International Patent Application No. PCT/US2002/34191.
Written Opinion for International Patent Application No. PCT/US2002/34191.
Search Report for International Patent Application No. PCT/US2007/69937.
Written Opinion for International Patent Application No. PCT/US2007/69937.
Search Report for International Patent Application No. PCT/US2007/69964.
Written Opinion for International Patent Application No. PCT/US2007/69964.
Notification of Transmittall of the International Search Report issued for corresponding PCT Application PCT/US02/34191.
Picart et al., "Molecular basis for the explanation of the expotential growth of polyelectrolyte multilayers" PNAS 99(20):12531-12535 (2002).

* cited by examiner

SPS    PAA    LPEI    PDAC

PAZO

TEMPLATE — MULTILAYER DEPOSITION → COATED PARTICLE — TEMPLATE REMOVAL → HOLLOW CAPSULE

POLY 1

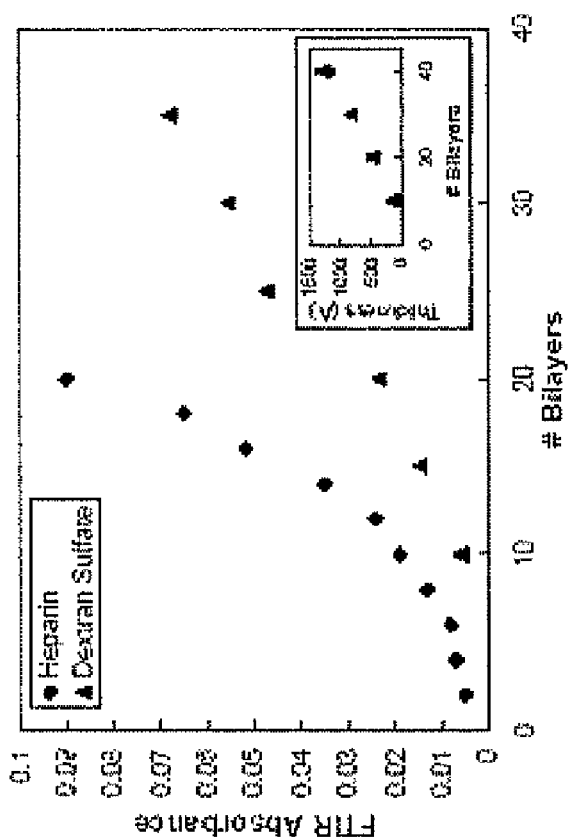
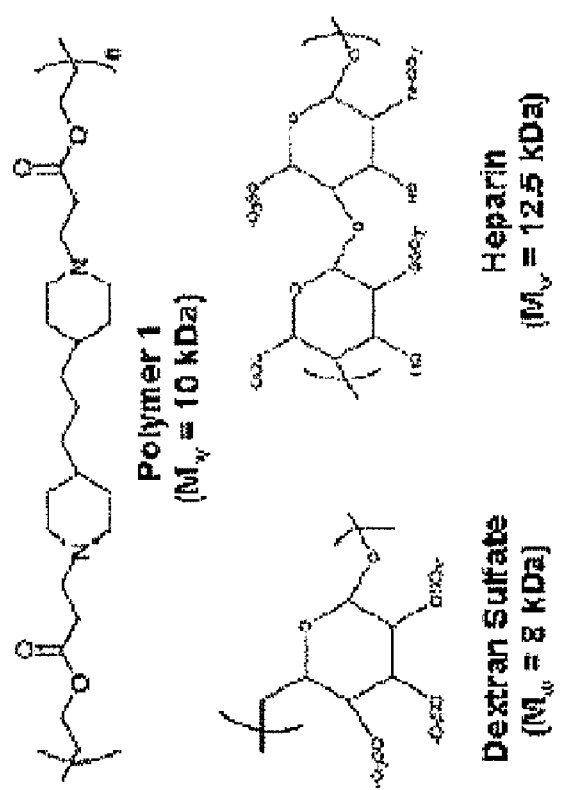
Figure 28

US 8,105,652 B2

METHODS OF MAKING DECOMPOSABLE THIN FILMS OF POLYELECTROLYTES AND USES THEREOF

This application is a continuation in part of and claims the priority of U.S. application Ser. No. 10/280,268, filed Oct. 24, 2004, U.S. Pat. No. 7,112,361, and further claims the priority of U.S. Provisional Application Ser. No. 60/335,213, filed Oct. 25, 2002 and Ser. No. 60/809,640, filed May 30, 2006, the entire contents of all of which are incorporated herein by reference.

GOVERNMENT FUNDING

The work described herein was supported, in part, by grants from the National Institutes of Health (GM26698; NRSA Fellowship #1 F32 GM20227-01), Division of Materials Research of the National Science Foundation (DMR 9903380), and the Office of Naval Research. Accordingly, the Government may have certain rights in this invention.

BACKGROUND OF THE INVENTION

The layer-by-layer (LBL) adsorption of oppositely-charged polyelectrolytes on surfaces has emerged as a simple, versatile, and inexpensive technique for the fabrication of thin multi-layer films, often with nanometer-scale control over the spatial distribution of ionized species within a film (Decher, G., Science, 277:1232-1237, 1997; Hammond P. T., Curr. Opin. Coll. Interface Sci., 3:32-39, 1998). First introduced by Decher in the early 90's (see Decher and Hong, Ber. Bunsenges. Phys. Chem. 95:1430, 1991 and Decher, Science, 277: 1232, 1997), the LBL approach is based on electrostatic attractions between polyelectrolytes and oppositely charged surfaces. In the example shown in FIG. 1, a negatively charged substrate is first dipped in a polycation solution. Electrostatic attractions result in deposition of the polycation and a resulting reversal of surface charge (see FIG. 1, step 1). The positively charged substrate is then submerged in a polyanion solution, resulting in deposition of the polyanion and restoration of the negative charge on the surface (see FIG. 1, step 2). Repetition of these steps leads to the buildup of layers of alternating oppositely charged polyelectrolytes on the substrate surface. In addition to electrostatics, other factors and secondary interactions such as hydrophobicity, salt interactions, solvent quality, polymer concentrations, and deposition time may affect the multi-layer growth of the film (for a review of these factors, see Dubas and Schlenoff, Macromolecules 32.8153, 1999, the contents of which are incorporated herein by reference).

The array of materials available for LBL assembly is broad, including synthetic polyelectrolytes, conducting polymers, dyes, and metal colloids, as well as a variety of biological species such as proteins, viruses, and DNA. Applications as diverse as conductive and light-emitting films, biologically-active surfaces, selective membranes, patterned films, and hollow multi-layer structures underscore the potential of the LBL technique (for a review of applications, see Hammond, Curr. Opin. Coll. Interface Sci. 3:32, 1998, the contents of which are incorporated herein by reference).

Despite the incorporation of new functionality, there are relatively few examples of multi-layer thin films designed to release incorporated or encapsulated compounds. In particular, there remains a need in the art for thin film controlled release systems that function under physiological conditions.

SUMMARY OF THE INVENTION

In one aspect, the invention is a decomposable thin film. The thin film includes a plurality of polyelectrolyte bilayers including a first polyelectrolyte layer having a first charge and a second polyelectrolyte layer having a second charge. At least a first portion of the polyelectrolyte bilayers include an entity selected from a biomolecule, a small molecule, and a bioactive agent. Decomposition of the thin film is characterized by sequential removal of at least a portion of the polyelectrolyte layers having the first charge and degradation of polyelectrolyte layers having the second charge and by release of the entity from the corresponding bilayer. The decomposable thin film further includes at least one polyelectrolyte bilayer through which the entity does not readily diffuse. The first polyelectrolyte layer and the second polyelectrolyte layer may be covalently cross-linked to one another within at least one of the polyelectrolyte bilayers. A plurality of the polyelectrolyte bilayers may be cross-linked. The thin film may include alternating polycationic and polyanionic layers and decomposition of the thin film may be characterized by hydrolytic degradation of at least a portion of the polycationic layers, polyanionic layers, or both. At least a portion of the first polyelectrolyte layers, the second polyelectrolyte layers, or both, may include a polymer including an anionic group, a cationic group, or both. The group may be incorporated into the backbone of the polymer, covalently attached to the backbone of the polymer, or covalently attached to a pendent group of the polymer. Degradation may be hydrolytic, thermal, enzymatic, photolytic, or some combination of these. The at least one covalently cross-linked polyelectrolyte bilayer may prevent diffusion of the entity within the thin film.

In another aspect, the invention is a method of encapsulating an entity within a thin film. The method includes disposing the entity within a thin film including a plurality of polyelectrolyte bilayer including a first polyelectrolyte layer having a first charge and a second polyelectrolyte layer having a second charge. The decomposable thin film includes at least one polyelectrolyte bilayer through which the entity does not readily diffuse. The method may further include covalently cross-linking at least one of the polyelectrolyte bilayers.

In another aspect, the invention is a method of releasing an entity from a thin film. The method includes providing a decomposable thin film including a plurality polyelectrolyte bilayers including a first polyelectrolyte layer having a first charge and a second polyelectrolyte layer having a second charge. The entity is associated with at least one of the bilayers and the decomposable thin film includes at least one polyelectrolyte bilayer through which the entity does not readily diffuse. The method further includes placing the thin film in a medium in which at least a portion of the thin film decomposes via the substantially sequential removal of at least a portion of the polyelectrolyte layers having a first charge and degradation of polyelectrolyte layers having the second charge. The method may further include covalently cross-linking at least one of the polyelectrolyte bilayers.

DEFINITIONS

"Animal": The term animal, as used herein, refers to humans as well as non-human animals, including, for example, mammals, birds, reptiles, amphibians, and fish. Preferably, the non-human animal is a mammal (e.g., a rodent, a mouse, a rat, a rabbit, a monkey, a dog, a cat a primate, or a pig). An animal may be a transgenic animal.

"Associated with": When two entities are "associated with" one another as described herein, they are linked by a direct or indirect covalent or non-covalent interaction. Exemplary non-covalent interactions include hydrogen bonding, van der Waals interactions, hydrophobic interactions, magnetic interactions, electrostatic interactions, etc.

"Biomolecules": The term "biomolecules", as used herein, refers to molecules (e.g., proteins, amino acids, peptides, polynucleotides, nucleotides, carbohydrates, sugars, lipids, nucleoproteins, glycoproteins, lipoproteins, steroids, etc.) whether naturally-occurring or artificially created (e.g., by synthetic or recombinant methods) that are commonly found in cells and tissues. Specific classes of biomolecules include, but are not limited to, enzymes, receptors, neurotransmitters, hormones, cytokines, cell response modifiers such as growth factors and chemotactic factors, antibodies, vaccines, haptens, toxins, interferons, ribozymes, anti-sense agents, plasmids, DNA, and RNA.

"Biocompatible": The term "biocompatible", as used herein is intended to describe materials that do not elicit a substantial detrimental response in vivo.

"Biodegradable": As used herein, "biodegradable" polymers are polymers that degrade fully under physiological or endosomal conditions. In preferred embodiments, the polymers and biodegradation byproducts are biocompatible. Biodegradable polymers are not necessarily hydrolytically degradable and may require enzymatic action to fully degrade.

"Degradation": The phrase "degradation", as used herein, relates to the cleavage of a covalent polymer backbone. Full degradation of a polymer breaks the polymer down to monomeric species.

"Endosomal conditions": The phrase "endosomal conditions", as used herein, relates to the range of chemical (e.g., pH, ionic strength) and biochemical (e.g., enzyme concentrations) conditions likely to be encountered within endosomal vesicles. For most endosomal vesicles, the endosomal pH ranges from about 5.0 to 6.5.

"Hydrolytically degradable": As used herein, "hydrolytically degradable" polymers are polymers that degrade fully in the sole presence of water. In preferred embodiments, the polymers and hydrolytic degradation byproducts are biocompatible. As used herein, the term "non-hydrolytically degradable" refers to polymers that do not fully degrade in the sole presence of water.

"Physiological conditions": The phrase "physiological conditions", as used herein, relates to the range of chemical (e.g., pH, ionic strength) and biochemical (e.g., enzyme concentrations) conditions likely to be encountered in the intracellular and extracellular fluids of tissues. For most tissues, the physiological pH ranges from about 7.0 to 7.4.

"Polyelectrolyte" or "polyion": The terms "polyelectrolyte" or "polyion", as used herein, refer to a polymer which under some set of conditions (e.g., physiological conditions) has a net positive or negative charge. Polycations have a net positive charge and polyanions have a net negative charge. The net charge of a given polyelectrolyte or polyion may depend on the surrounding chemical conditions, e.g., on the pH.

"Polynucleotide", "nucleic acid", or "oligonucleotide": The terms "polynucleotide", "nucleic acid", or "oligonucleotide" refer to a polymer of nucleotides. The terms "polynucleotide", "nucleic acid", and "oligonucleotide", may be used interchangeably. Typically, a polynucleotide comprises at least three nucleotides. DNAs and RNAs are polynucleotides. The polymer may include natural nucleosides (i.e., adenosine, thymidine, guanosine, cytidine, uridine, deoxyadenosine, deoxythymidine, deoxyguanosine, and deoxycytidine), nucleoside analogs (e.g., 2-aminoadenosine, 2-thiothymidine, inosine, pyrrolo-pyrimidine, 3-methyl adenosine, C5-propynylcytidine, C5-propynyluridine, C5-bromouridine, C5-fluorouridine, C5-iodouridine, C5-methylcytidine, 7-deazaadenosine, 7-deazaguanosine, 8-oxoadenosine, 8-oxoguanosine, O(6)-methylguanine, and 2-thiocytidine), chemically modified bases, biologically modified bases (e.g., methylated bases), intercalated bases, modified sugars (e.g., 2'-fluororibose, ribose, 2-deoxyribose, arabinose, and hexose), or modified phosphate groups (e.g., phosphorothioates and 5'-N-phosphoramidite linkages).

"Polypeptide", "peptide", or "protein": According to the present invention, a "polypeptide", "peptide", or "protein" comprises a string of at least three amino acids linked together by peptide bonds. The terms "polypeptide", "peptide", and "protein", may be used interchangeably. Peptide may refer to an individual peptide or a collection of peptides. Inventive peptides preferably contain only natural amino acids, although non-natural amino acids (i.e., compounds that do not occur in nature but that can be incorporated into a polypeptide chain; see, for example, http://www.cco.caltech.edu/~dadgrp/Unnatstruct.gif, which displays structures of non-natural amino acids that have been successfully incorporated into functional ion channels) and/or amino acid analogs as are known in the art may alternatively be employed. Also, one or more of the amino acids in an inventive peptide may be modified, for example, by the addition of a chemical entity such as a carbohydrate group, a phosphate group, a farnesyl group, an isofarnesyl group, a fatty acid group, a linker for conjugation, functionalization, or other modification, etc. In a preferred embodiment, the modifications of the peptide lead to a more stable peptide (e.g., greater half-life in vivo). These modifications may include cyclization of the peptide, the incorporation of D-amino acids, etc. None of the modifications should substantially interfere with the desired biological activity of the peptide.

"Polysaccharide", "carbohydrate" or "oligosaccharide": The terms "polysaccharide", "carbohydrate", or "oligosaccharide" refer to a polymer of sugars. The terms "polysaccharide", "carbohydrate", and "oligosaccharide", may be used interchangeably. Typically, a polysaccharide comprises at least three sugars. The polymer may include natural sugars (e.g., glucose, fructose, galactose, mannose, arabinose, ribose, and xylose) and/or modified sugars (e.g., 2'-fluororibose, 2'-deoxyribose, and hexose).

"Small molecule": As used herein, the term "small molecule" is used to refer to molecules, whether naturally-occurring or artificially created (e.g., via chemical synthesis), that have a relatively low molecular weight. Typically, small molecules are monomeric and have a molecular weight of less than about 1500 g/mol. Preferred small molecules are biologically active in that they produce a local or systemic effect in animals, preferably mammals, more preferably humans. In certain preferred embodiments, the small molecule is a drug. Preferably, though not necessarily, the drug is one that has already been deemed safe and effective for use by the appropriate governmental agency or body. For example, drugs for human use listed by the FDA under 21 C.F.R. §§330.5, 331 through 361, and 440 through 460; drugs for veterinary use listed by the FDA under 21 C.F.R. §§500 through 589, incorporated herein by reference, are all considered acceptable for use in accordance with the present invention.

"Bioactive agents": As used herein, "bioactive agents" is used to refer to compounds or entities that alter, inhibit, activate, or otherwise affect biological or chemical events. For example, bioactive agents may include, but are not limited to, anti-AIDS substances, anti-cancer substances, antibiotics, immunosuppressants, anti-viral substances, enzyme inhibitors, neurotoxins, opioids, hypnotics, anti-histamines, lubricants, tranquilizers, anti-convulsants, muscle relaxants and anti-Parkinson substances, anti-spasmodics and muscle contractants including channel blockers, miotics and anti-cholinergics, anti-glaucoma compounds, anti-parasite and/or anti-protozoal compounds, modulators of cell-extracellular matrix interactions including cell growth inhibitors and anti-adhesion molecules, vasodilating agents, inhibitors of DNA, RNA or protein synthesis, anti-hypertensives, analgesics, anti-pyretics, steroidal and non-steroidal anti-inflammatory agents, anti-angiogenic factors, anti-secretory factors, anti-coagulants and/or antithrombotic agents, local anesthetics, ophthalmics, prostaglandins, anti-depressants, anti-psychotic substances, anti-emetics, and imaging agents. In certain embodiments, the bioactive agent is a drug.

A more complete listing of bioactive agents and specific drugs suitable for use in the present invention may be found in "Pharmaceutical Substances: Syntheses, Patents, Applications" by Axel Kleemann and Jurgen Engel, Thieme Medical Publishing, 1999; the "Merck Index: An Encyclopedia of Chemicals, Drugs, and Biologicals", Edited by Susan Budavari et al., CRC Press, 1996, and the United States Pharmacopeia-25/National Formulary-20, published by the United States Pharmcopeial Convention, Inc., Rockville Md., 2001, all of which are incorporated herein by reference.

Acronyms

The following acronyms are used herein: "SPS" is poly (styrene sulfonate), "PAA" is poly(acrylic acid), "LPEI" is linear poly(ethylene imine), "PDAC" is poly(diallyl dimethyl ammonium chloride), "PAH" is poly(allylamine hydrochloride), and "PAZO" is the azobenzene functionalized polymer poly {1-[4-(3-carboxy-4-hydroxyphenylazo) benzensulfonamido]-1,2-ethanediyl}.

DESCRIPTION OF THE DRAWING

The invention is described with reference to several figures of the drawing, in which:

FIG. 28. (A) A plot of FTIR absorbance versus number of thin film bilayers according to an exemplary embodiment demonstrates layer-by-layer assembly of (polymer 1/heparin) (diamond) and (polymer 1/dextran sulfate) (triangle) films exhibiting exponential and linear growth, respectively. (Inset: Thickness versus number of bilayers for (polymer 1/dextran sulfate) films.) (B) Chemical structures of degradable polymer and model drugs used in an exemplary embodiment;

DETAILED DESCRIPTION

The present invention provides a method for the gradual and controlled release of one or more entities from decomposable thin films. The decomposition is characterized by the substantially sequential degradation of at least a portion of the polyelectrolyte layers that make up the thin films. The degradation may be at least partially hydrolytic, at least partially enzymatic, at least partially thermal, and/or at least partially photolytic. In some embodiments, the thin films are about 1 nm and about 100 µm thick, for example, between about 1 nm and about 100 nm thick, between about 100 nm and about 1 µm thick, between about 1 µm and about 10 µm thick, or between about 10 µm and about 100 µm thick.

Several groups have reported the deposition of polyelectrolytes onto microcrystalline templates to yield semi-permeable films that release compounds via diffusion (see Qiu et at, *Langmuir* 17:5375, 2001 and Antipov et al., *J. Phys. Chem. B* 105:2281, 2001). However, while multi-layer films are permeable to small molecules (e.g., ibuprofen and fluorescein), they are much less permeable to molecules with molecular weights larger than 4 kDa (see Sukhorukov et al., *J. Phys. Chem. B* 103:6434, 1999), and are therefore less well-suited to the diffusive release of biomolecules, e.g., DNA, RNA, and proteins.

Recent work has also demonstrated that certain multi-layer films can be "deconstructed" at high salt concentrations (see Dubas and Schlenoff, *Macromolecules* 34:3736, 2001). As described by Dubas and Schlenoff, at high salt concentrations the free ions compete for the charged groups of the polyelectrolytes and hence weaken intermolecular interactions within the film, thereby causing it to fall apart. This concept has been extended to the fabrication of films that release DNA in the presence of salt (see Schüler and Caruso, *Biomacromolecules* 2:921, 2001). Unfortunately, deconstruction occurs under conditions of high ionic strength (e.g., salt concentrations of 0.6-5 M), and is therefore not well-suited to the release of molecules under physiological conditions.

Figure 1:
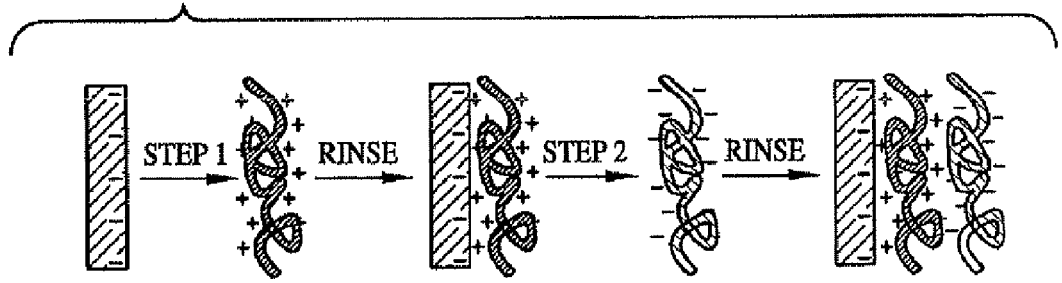
FIG. 1 is a schematic illustrating the construction of a thin film via layer-by-layer deposition of polyelectrolytes on a charged substrate.
Figure 2:
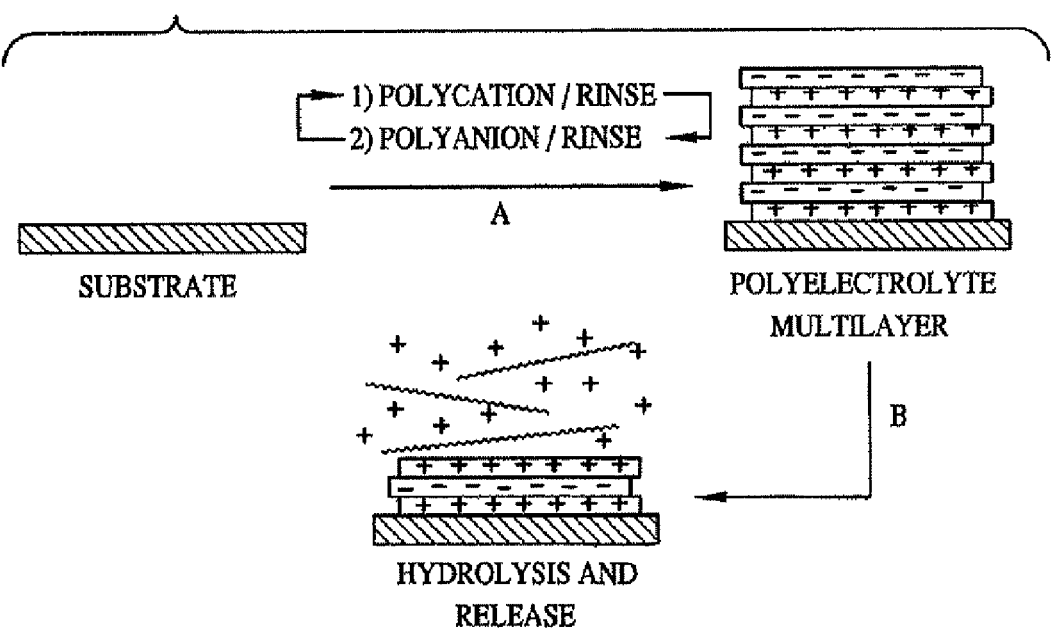
FIG. 2 is a schematic illustrating the construction and decomposition of a thin film according to one embodiment of the invention by (A) layer-by-layer deposition of alternating polyanionic and polycationic layers and (B) degradation of polycationic layers and release of polyanionic components.

In certain embodiments of the instant invention, the released entities are structural polyelectrolyte components of the inventive films. One such embodiment of the invention is illustrated in FIG. 2. In step A of this embodiment, the thin film is deposited on a substrate via layer-by-layer assembly as depicted in FIG. 1. The thin film includes a plurality of alternating polyanionic and polycationic layers. The polycationic layers include a degradable polycation. In step B, the thin film is exposed to a degrading medium (e.g., intracellular fluid), whereupon the polycationic layers degrade and the polyanionic layers delaminate sequentially from the surface toward the substrate. The component polyanions of the exposed polyanionic layers are thus gradually and controllably released from the surface of the thin film. In preferred embodiments, the released polyanions are biomolecules, for example, DNA molecules. If the thin film is to be disposed in vivo, the polycations and their degradation byproducts are preferably biocompatible. It will be appreciated that the roles of the two layers of the thin film can be reversed. In such embodiments, the polyanionic layers include a degradable polyanion and the polycationic layers may include, for example, a polycationic protein. Alternatively, both the polycationic and polyanionic layers may both include degradable polyelectrolytes.

A variety of materials can be used as substrates of the present invention such as, but not limited to, metals, e.g., gold, silver, platinum, and aluminum; metal-coated materials; metal oxides; plastics; ceramics; silicon; glasses; mica; graphite; hydrogels; and polymers such as polyamides, polyphosphazenes, polypropylfumarates, polyethers, polyacetals, polycyanoacrylates, polyurethanes, polycarbonates, polyanhydrides, polyorthoesters, polyhydroxyacids, polyacrylates, ethylene vinyl acetate polymers and other cellulose acetates, polystyrenes, poly(vinyl chloride), poly(vinyl fluoride), poly(vinyl imidazole), poly(vinyl alcohol), poly(ethylene terephthalate), polyesters, polyureas, polypropylene, polymethacrylate, polyethylene, poly(ethylene oxide)s and chlorosulphonated polyolefins; and combinations thereof. For example, a substrate of one material may be coated with a second material, or two materials may be combined to form a composite.

It will be appreciated that materials with an inherently charged surface are particularly attractive substrates for LBL assembly of a thin film. Alternatively, a range of methods are known in the art that can be used to charge the surface of a material, including but not limited to plasma processing, corona processing, flame processing, and chemical processing, e.g., etching, micro-contact printing, and chemical modification. For example, plastics can be used as substrates, particularly if they have been chemically modified to present polar or charged functional groups on the surface. Additionally or alternatively, substrates can be primed with specific polyelectrolyte bilayers such as, but not limited to, LPEI/SPS, PDAC/SPS, PAH/SPS, LPEI/PAA, PDAC/PAA, and PAH/PAA bilayers, that form readily on weakly charged surfaces and occasionally on neutral surfaces. It will be appreciated that primer layers provide a uniform surface layer for further LBL assembly and are therefore particularly well suited to applications that require the deposition of a uniform thin film on a substrate that includes a range of materials on its surface, e.g., an implant or a complex tissue engineering construct.

Any degradable polyelectrolyte can be used in a thin film of the present invention, including, but not limited to, hydrolytically degradable, biodegradable, thermally degradable, and photolytically degradable polyelectrolytes. Hydrolytically degradable polymers known in the art include for example, certain polyesters, polyanhydrides, polyorthoesters, polyphosphazenes, and polyphosphoesters. Biodegradable polymers known in the art include, for example, certain polyhydroxyacids, polypropylfumerates, polycaprolactones, polyamides, poly(amino acids), polyacetals, polyethers, biodegradable polycyanoacrylates, biodegradable polyurethanes and polysaccharides. For example, specific biodegradable polymers that may be used in the present invention include but are not limited to polylysine, poly(lactic acid) (PLA), poly(glycolic acid) (PGA), poly(caprolactone) (PCL), poly(lactide-co-glycolide) (PLG), poly(lactide-co-caprolactone) (PLC), and poly(glycolide-co-caprolactone) (PGC). Those skilled in the art will recognize that this is an exemplary, not comprehensive, list of biodegradable polymers. The properties of these and other polymers and methods for preparing them are further described in the art. See, for example, U.S. Pat. Nos. 6,123,727; 5,804,178; 5,770,417; 5,736,372; 5,716,404 to Vacanti; 6,095,148; 5,837,752 to Shastri; 5,902,599 to Anseth; 5,696,175; 5,514,378; 5,512,600 to Mikos; 5,399,665 to Barrera; 5,019,379 to Domb; 5,010,167 to Ron; 4,806,621; 4,638,045 to Kohn; and 4,946,929 to d'Amore; see also Wang et al., *J. Am. Chem. Soc.* 123:9480, 2001; Lim et at, *J. Am. Chem. Soc.* 123:2460, 2001; Langer, *Acc. Chem. Res.* 33:94, 2000; Langer, *J. Control Release* 62:7, 1999; and Uhrich et al., *Chem. Rev.* 99:3181, 1999. Of course, co-polymers, mixtures, and adducts of these polymers may also be employed.

The anionic polyelectrolytes may be degradable polymers with anionic groups distributed along the polymer backbone. The anionic groups, which may include carboxylate, sulfonate, sulphate, phosphate, nitrate, or other negatively charged or ionizable groupings, may be disposed upon groups pendant from the backbone or may be incorporated in the backbone itself. The cationic polyelectrolytes may be degradable polymers with cationic groups distributed along the polymer backbone. The cationic groups, which may include protonated amine, quaternary ammonium or phosphonium derived functions or other positively charged or ionizable groups, may be disposed in side groups pendant from the backbone, may be attached to the backbone directly, or can be incorporated in the backbone itself.

For example, a range of hydrolytically degradable amine containing polyesters bearing cationic side chains have recently been developed (Putnam et al *Macromolecules* 32:3658-3662, 1999; Barrera et al. *J. Am. Chem. Soc.* 115: 11010-11011, 1993; Kwon et al. *Macromolecules* 22:3250-3255, 1989; Lim et al. *J. Am. Chem. Soc.* 121:5633-5639, 1999; Zhou et al. *Macromolecules* 23:3399-3406, 1990; each of which is incorporated herein by reference). Examples of these polyesters include poly(L-lactide-co-L-lysine) (Barrera et al. *J. Am. Chem. Soc.* 115:11010-11011, 1993; incorporated herein by reference), poly(serine ester) (Zhou et al. *Macromolecules* 23:3399-3406, 1990; which is incorporated herein by reference), poly(4-hydroxy-L-proline ester) (Putnam et al. *Macromolecules* 32:3658-3662, 1999.; Lim et al *J. Am. Chem. Soc.* 121:5633-5639, 1999; each of which is incorporated herein by reference), and more recently, poly[α-(4-aminobutyl)-L-glycolic acid].

In addition, poly(β-amino ester)s, prepared from the conjugate addition of primary or secondary amines to diacrylates, are suitable for use with the invention. Typically, poly(β-amino ester)s have one or more tertiary amines in the backbone of the polymer, preferably one or two per repeating backbone unit. Alternatively, a co-polymer may be used in which one of the components is a poly(β-amino ester). Poly (β-amino ester)s are described in U.S. Ser. No. 09/969,431, filed Oct. 2, 2001, entitled "Biodegradable poly(β-amino esters) and uses thereof" and Lynn et al, *J. Am. Chem. Soc.* 122:10761-10768, 2000, the entire contents of both of which are incorporated herein by reference.

Figure 3:
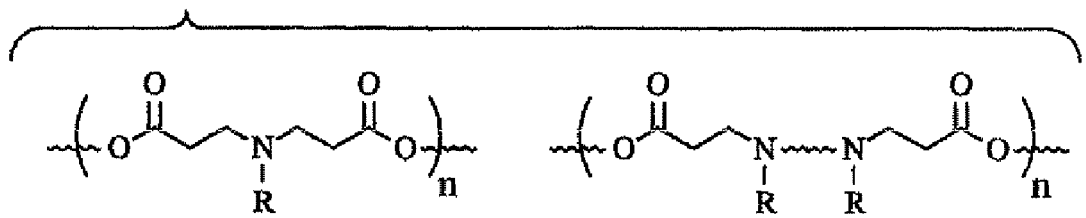
FIG. 3 depicts the chemical structure of exemplary hydrolytically degradable polycations for the fabrication of a decomposable thin film.

Exemplary poly(β-amino ester)s are shown in FIG. 3. Exemplary R groups include hydrogen, branched and unbranched alkyl branched and unbranched alkenyl, branched and unbranched alkynyl, aryl, halogen, hydroxyl, alkoxy, carbamoyl, carboxyl ester, carbonyldioxyl, amide, thiohydroxyl, alkylthioether, amino, alkylamino, dialkylamino, trialkylamino, cyano, ureido, a substituted alkanoyl group, cyclic, cyclic aromatic, heterocyclic, and aromatic heterocyclic groups, each of which may be substituted with at least one substituent selected from the group consisting of branched and unbranched alkyl, branched and unbranched alkenyl, branched and unbranched alkynyl, amino, alkylamino, dialkylamino, trialkylamino, aryl, ureido, heterocyclic, aromatic heterocyclic, cyclic, aromatic cyclic, halogen, hydroxyl, alkoxy, cyano, amide, carbamoyl, carboxylic acid, ester, carbonyl, carbonyldioxyl, alkylthioether, and thiol groups.

Exemplary linker groups A and B include carbon chains of 1 to 30 carbon atoms, heteroatom-containing carbon chains of 1 to 30 atoms, and carbon chains and heteroatom-containing carbon chains with at least one substituent selected from the group consisting of branched and unbranched alkyl, branched and unbranched alkenyl, branched and unbranched alkynyl, amino, alkylamino, dialkylamino, trialkylamino, aryl, ureido, heterocyclic, aromatic heterocyclic, cyclic, aromatic cyclic, halogen, hydroxyl, alkoxy, cyano, amide, carbamoyl, carboxylic acid, ester, carbonyl, carbonyldioxyl, alkylthioether, and thiol groups. The polymer may include, for example, between 5 and 10,000 repeat units.

Alternatively, zwitterionic polyelectrolytes may be used. Such polyelectrolytes may have both anionic and cationic groups incorporated into the backbone or covalently attached to the backbone as part of a pendant group. Such polymers may be neutrally charged at one pH, positively charged at another pH, and negatively charged at a third pH. For example, a film may be deposited by LBL deposition using dip coating in solutions of a first pH at which one layer is anionic and a second layer is cationic. If the film is put into a solution having a second different pH, then the first layer may be rendered cationic while the second layer is rendered anionic, thereby changing the charges on those layers.

In certain embodiments, the LBL assembly of films may involve a series of dip coating steps in which the substrate is dipped in alternating polycationic and polyanionic solutions (see FIG. 1). Additionally or alternatively, it will be appreciated that deposition of alternating polycationic and polyanionic layers may also be achieved by spray coating, brush coating, roll coating, spin casting, or combinations of any of these techniques.

Figure 4:
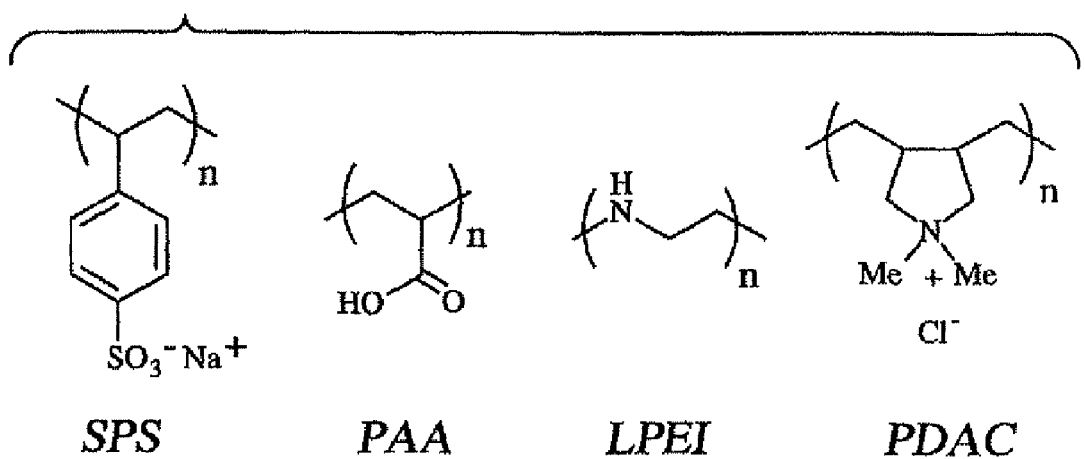
FIG. 4 depicts the chemical structure of exemplary non-degradable polyanions and polycations for the fabrication of a thin film according to one embodiment of this invention.
Figure 5:
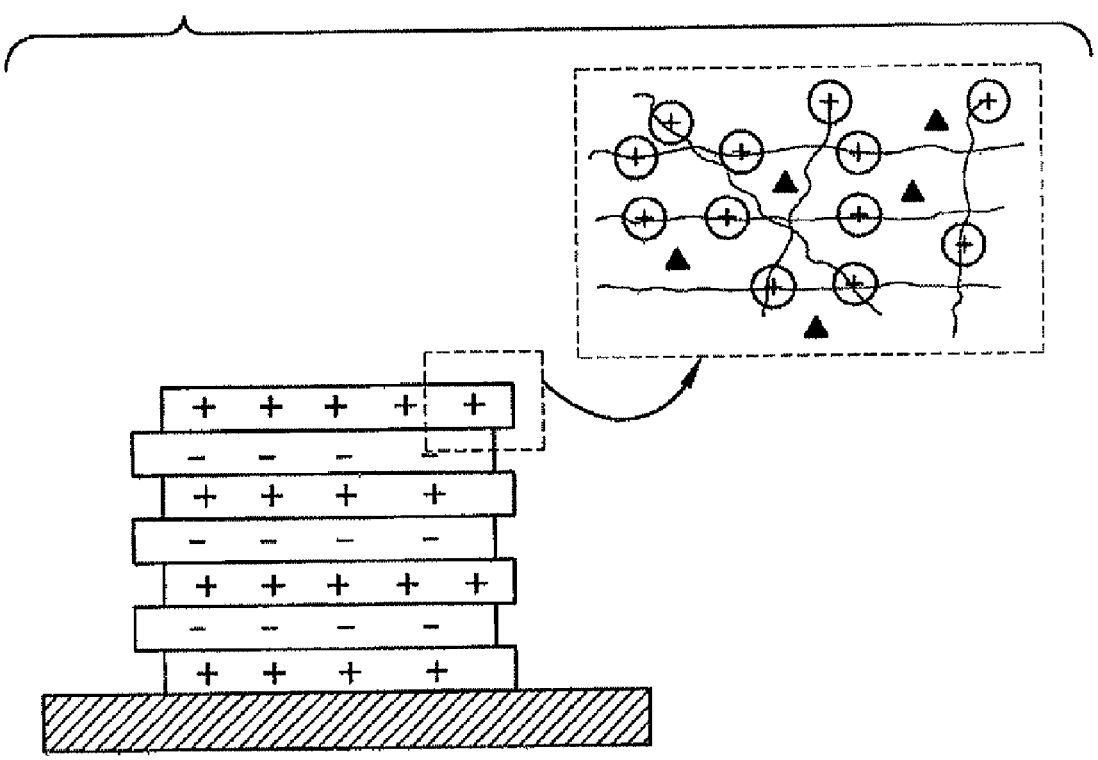
FIG. 5 is a schematic illustrating entities (shown as black triangles), e.g., biomolecules or small molecules that are non-covalently associated with polycations of a thin film according to one embodiment of the invention.
Figure 6:
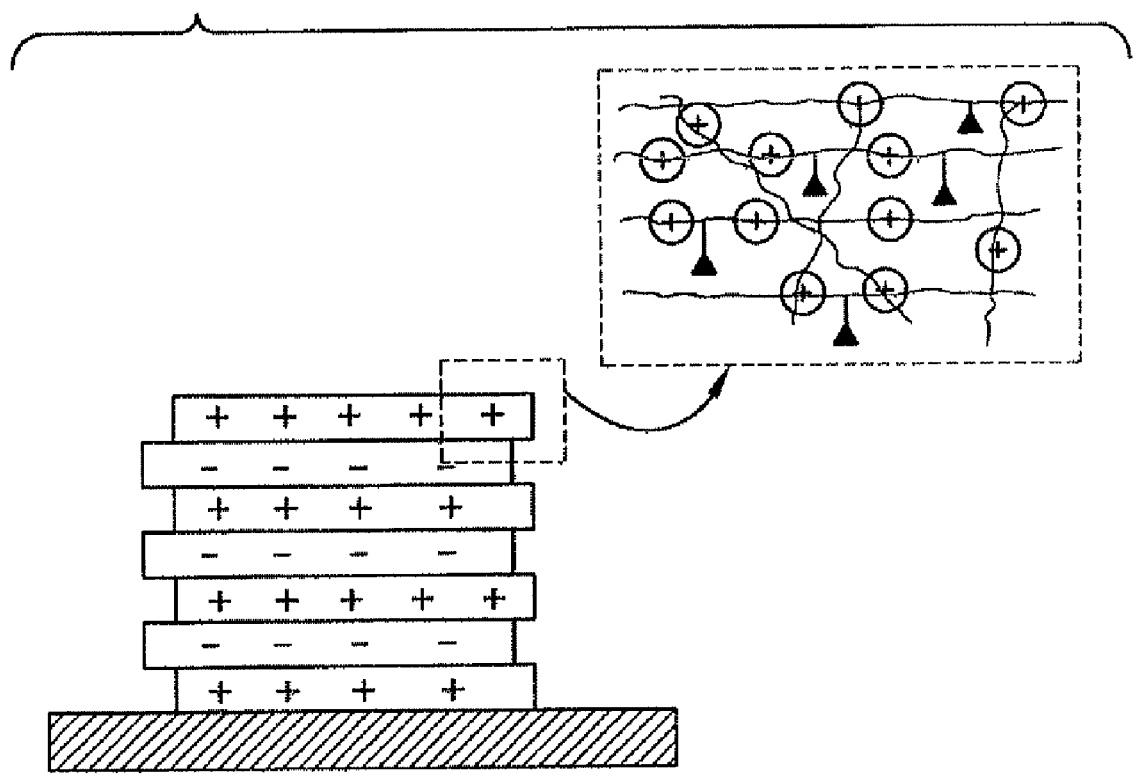
FIG. 6 is a schematic illustrating entities (shown as black triangles), e.g., biomolecules or small molecules that are covalently associated with polycations of a thin film according to one embodiment of the invention.

The composition of the polyanionic and polycationic layers can be fine-tuned to adjust the degradation rate of each layer within the film. For example, the degradation rate of hydrolytically degradable polyelectrolyte layers can be decreased by associating hydrophobic polymers such as hydrocarbons and lipids with one or more of the layers. Alternatively, the polyelectrolyte layers may be rendered more hydrophilic to increase their hydrolytic degradation rate. In certain embodiments, the degradation rate of a given layer can be adjusted by including a mixture of polyelectrolytes that degrade at different rates or under different conditions. In other embodiments, the polyanionic and/or polycationic layers may include a mixture of degradable and non-degradable polyelectrolytes. Any non-degradable polyelectrolyte can be used with the present invention. Exemplary non-degradable polyelectrolytes that could be used in thin films are shown in FIG. 4 and include poly(styrene sulfonate) (SPS), poly (acrylic acid) (PAA), linear poly(ethylene imine) (LPEI), poly(diallyldimethyl ammonium chloride) (PDAC), and poly (allylamine hydrochloride) (PAH).

Alternatively or additionally, the degradation rate may be fine-tuned by associating or mixing non-biodegradable, yet biocompatible polymers (polyionic or non-polyionic) with one or more of the polyanionic and/or polycationic layers. Suitable non-biodegradable, yet biocompatible polymers are well known in the art and include polystyrenes, certain polyesters, non-biodegradable polyurethanes, polyureas, poly (ethylene vinyl acetate), polypropylene, polymethacrylate, polyethylene, polycarbonates, and poly(ethylene oxide)s.

Furthermore, because the thin film is produced in a layer-by-layer fashion, the composition of individual layers may be varied to tailor the degradation rate of various portions of the film. For example, the upper layers of the film, closer to the surface, may be adjusted to degrade faster than the layers of the film closer to the substrate, or vice versa. Depending on the thickness of the film, the degradation rate within the film may be varied cyclically (e.g., for periodic release). Additionally or alternatively, the upper layers of the film, closer to the surface, may be adjusted to degrade under a first set of conditions (e.g., endosomal conditions) while the layers of the film that are closer to the substrate are adjusted to degrade under a second set of conditions (e.g., physiological conditions).

In some embodiments, the various layers of the film may be modified to control the diffusion of materials within the film. For example, the released entity may be one that does not readily diffuse through the layers of the film. Alternatively or in addition, bilayers may be covalently cross-linked to prevent diffusion of materials across the layers of the film. For example, a bilayer of two polymers of opposite charge may be cross-linked thermally or by other mechanisms. Thermal cross-linking may be achieved by heating the film for a particular period of time. Chemical cross-linking may be achieved by exposing a film to UV light. For example, polymers having double bonds in or pendant to the backbone may be employed in the thin film and cross-linked after deposition. In another embodiment, reactive groups such as carboxyl, thiol, amine, hydroxyl, or halogen may be exploited to covalently cross-link films. These groups may be made more reactive by methods known to those of skill in the art, for example, using carbodiimides or other groups such as isocyanates, 3-[(2-aminoethyl)dithio]propionic acid, and succinimidyl 4-[N-maleimidomethyl]cyclohexane-1-carboxylate (SMCC), that provide additional reactivity and good leaving groups. Additional groups that are suitable for cross-linking will depend on the composition of the various layers, as will be understood by those of skill in the art. A variety of cross-linking agents are available from Pierce Biotechnologies, Rockford, Ill.

Figure 18:
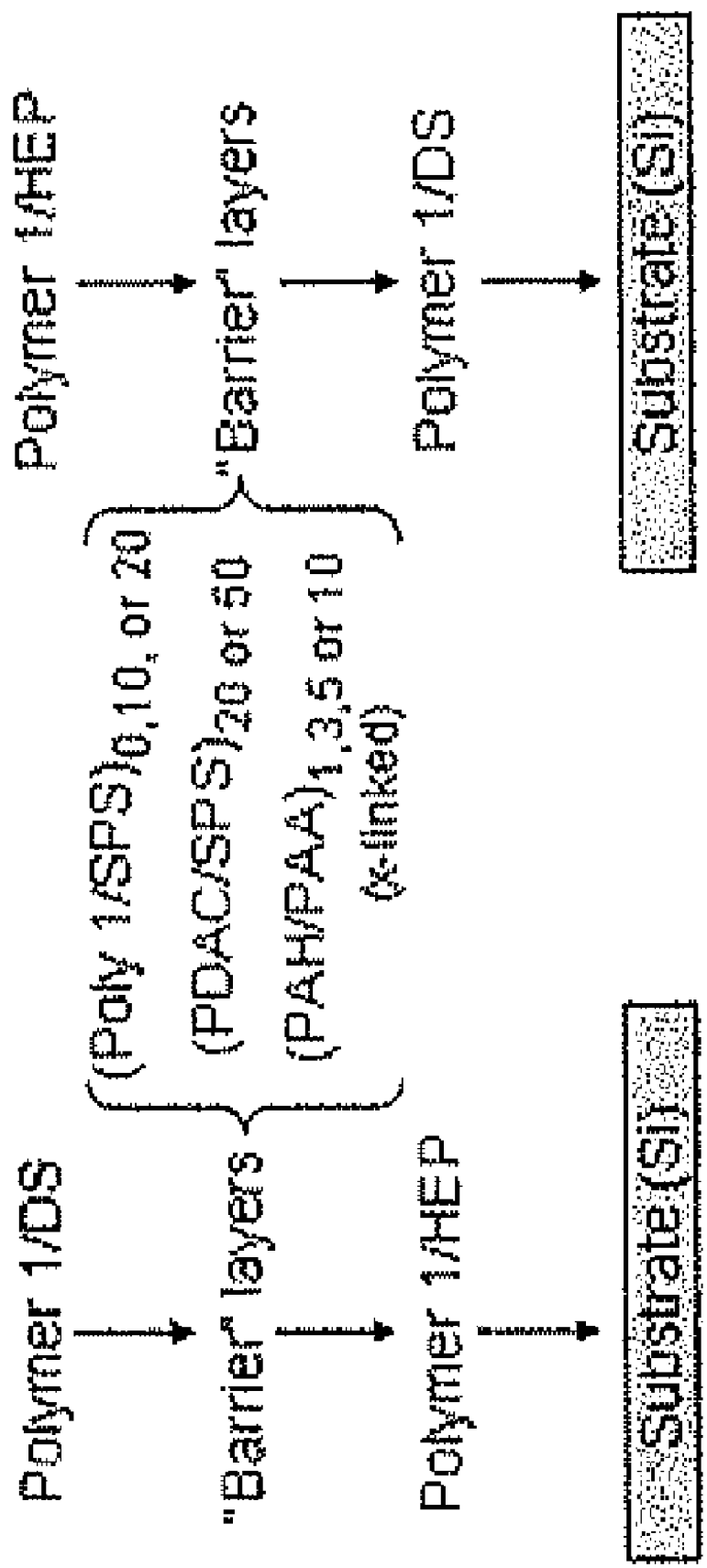
FIG. 18 is a schematic depicting exemplary strategies to construct physical barriers to control interlayer diffusion in multi-component films according to an exemplary embodiment.

In one exemplary embodiment, a range of strategies were employed to control the relative positions of multiple, labeled species within a single film by constructing physical barriers to separate the two components. In one embodiment, films were constructed containing 20-40 base layers of polymer 1/HEP, followed by a set of "barrier" layers including polymer 1/SPS (degradable), PDAC/SPS (non-degradable), thermally cross-linked PAH/PAA, or nothing at all, followed by 20-40 surface layers of polymer 1/DS (FIG. 18). A similar set of films was also constructed, but with the order of the labeled components reversed (e.g., DS base layers and HEP surface layers).

Figure 19:
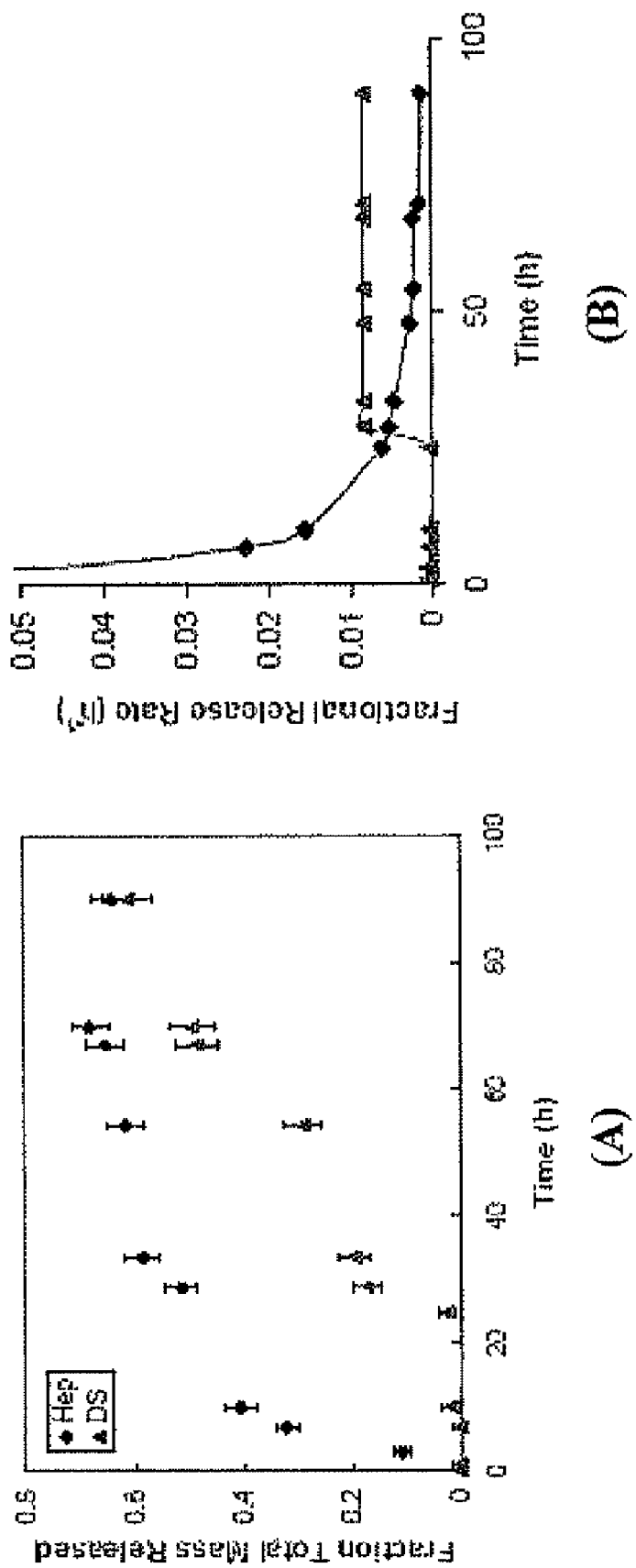
FIG. 19 is a graph showing how dextran sulfate (base layer, triangle) and heparin (surface layer, diamond)-loaded layers separated by a single, cross-linked layer of (PAH/PAA) according to an exemplary embodiment exhibit sequential release. (A) Fraction of mass released versus degradation time. (B) Fractional release rate versus time.
Figure 20:
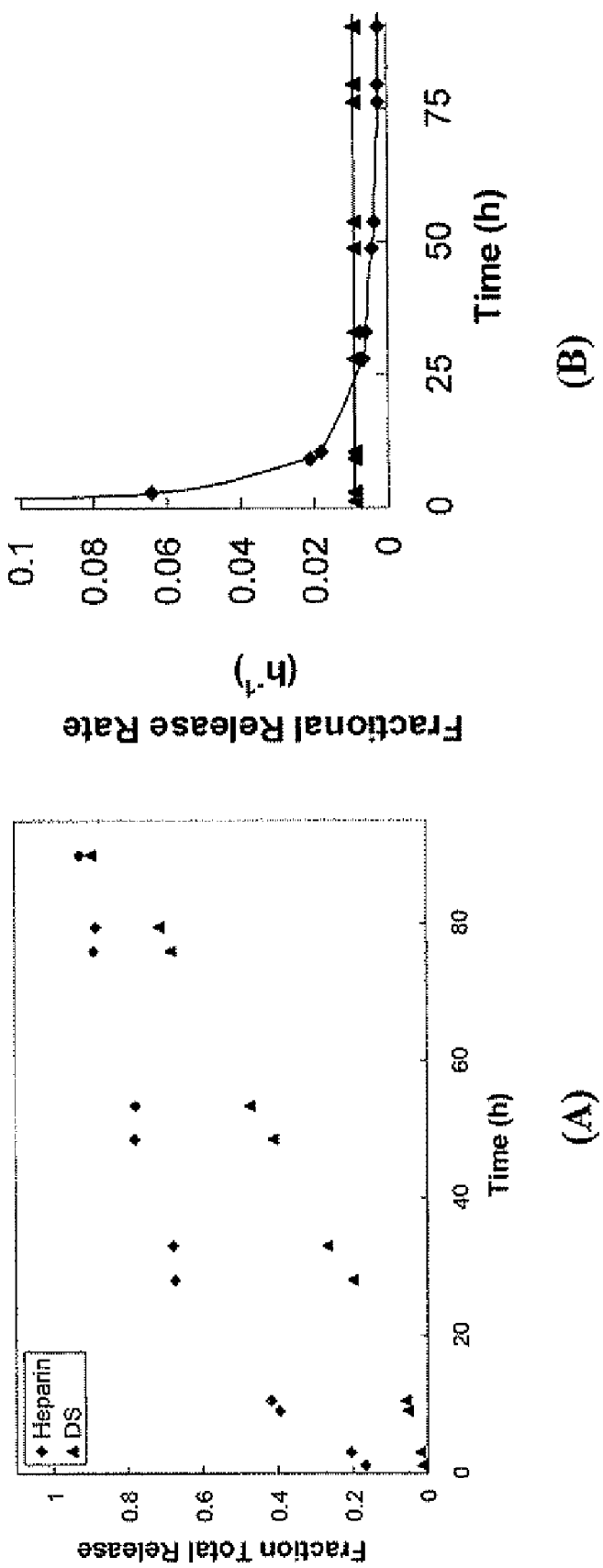
FIG. 20 is a graph illustrating that heparin (base layer, diamond) and dextran sulfate (surface layer, triangle)-loaded layers according to an exemplary embodiment, without dividing layers, sustain simultaneous release. (A) Fraction of mass released versus degradation time (error bars are small). (B) Fractional release rate versus time.
Figure 21:
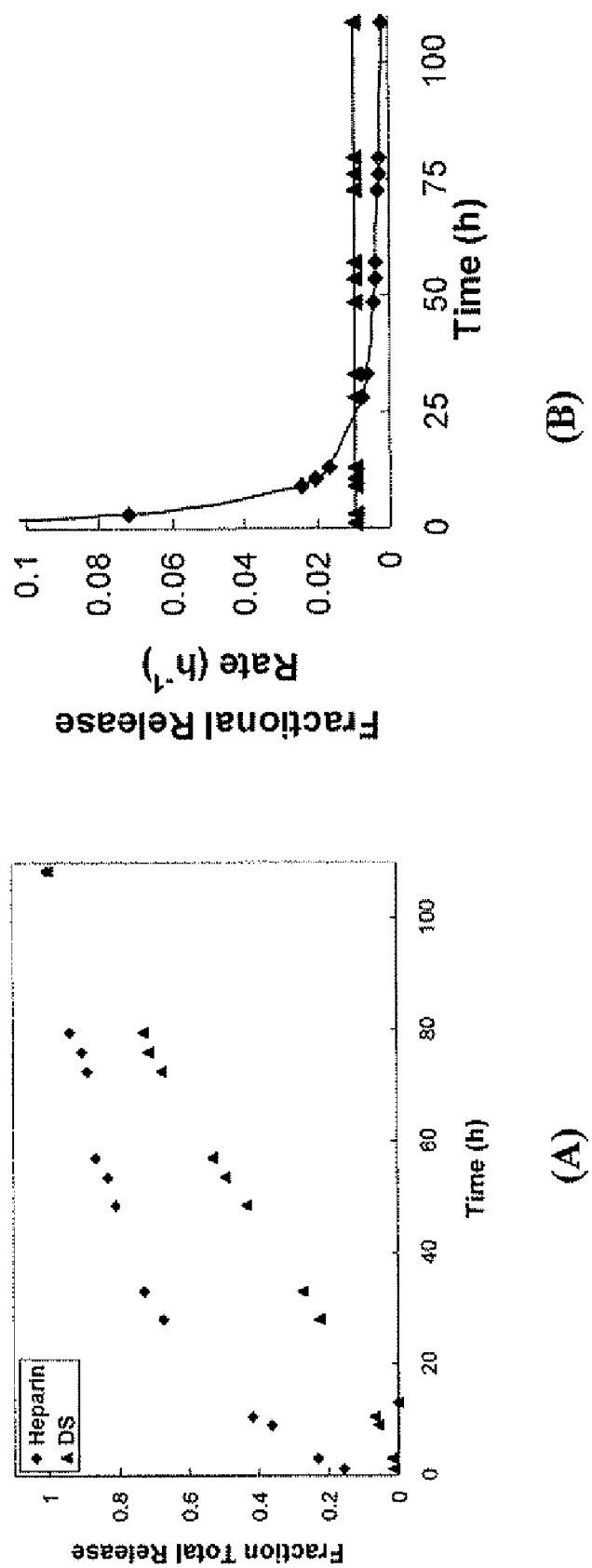
FIG. 21 is a graph illustrating that heparin (base layer, diamond) and dextran sulfate (surface layer, triangle)-loaded layers according to an exemplary embodiment, separated by (Poly1/SPS)20 degradable dividing layers, sustain simultaneous release. (A) Fraction of mass released versus degradation time (error bars are small). (B) Fractional release rate versus time.
Figure 22:
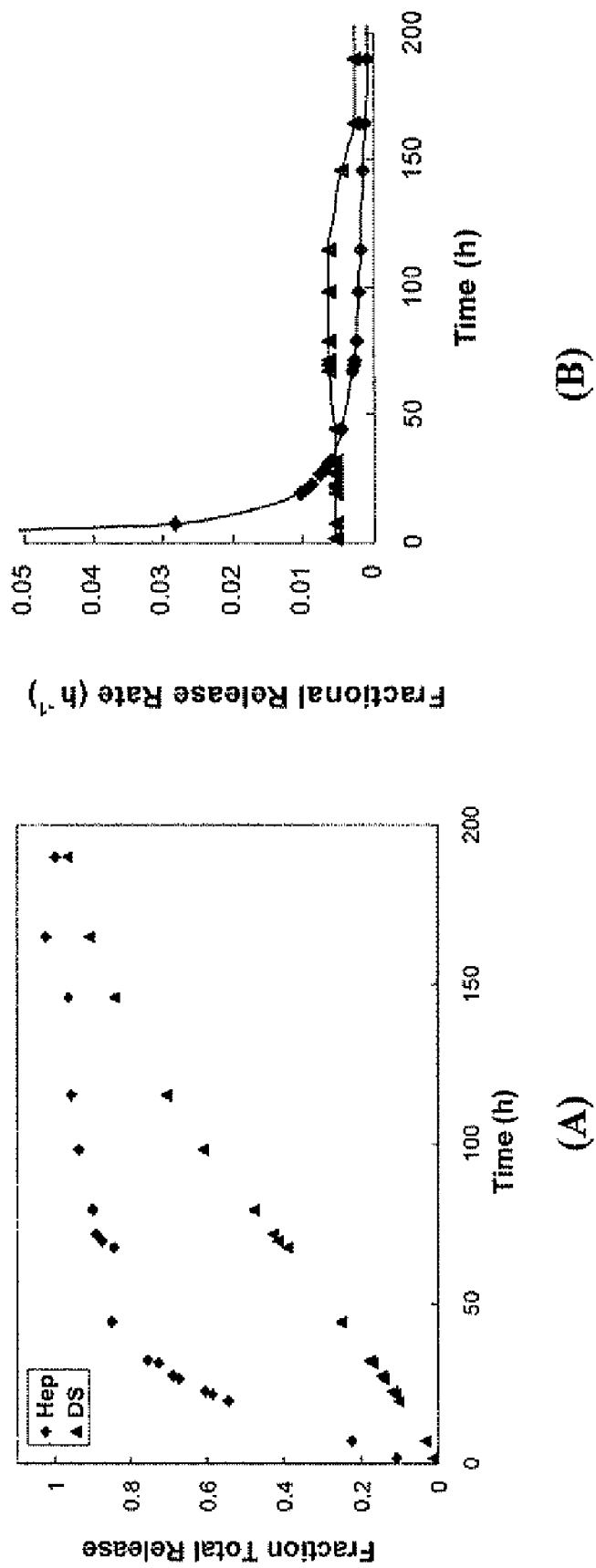
FIG. 22 is a graph illustrating that heparin (base layer, diamond) and dextran sulfate (surface layer, triangle)-loaded layers, separated by (PDAC/SPS)50 non-degradable dividing layers according to an exemplary embodiment, sustain simultaneous release. (A) Fraction of mass released versus degradation time (error bars are small). (B) Fractional release rate versus time.
Figure 23:
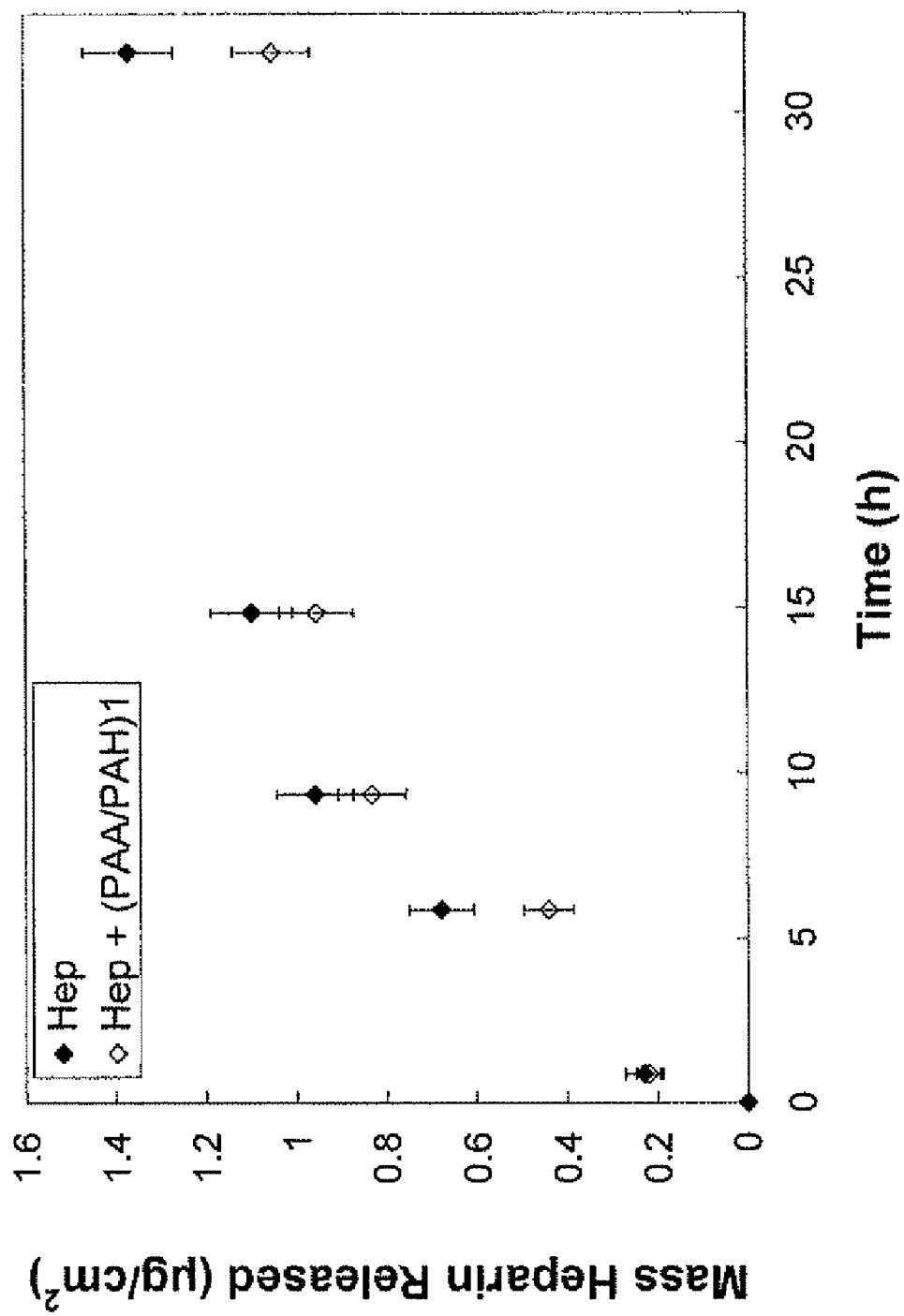
FIG. 23 is a graph illustrating that a single cross-linked according to an exemplary embodiment layer of (PAH/PAA) does not significantly delay the release of heparin. Release of heparin-loaded films coated with a single layer of (PAH/PAA) cross-linked for 45 min at 215° C. (filled diamond) is compared with untreated heparin-loaded films (open diamonds)
Figure 24:
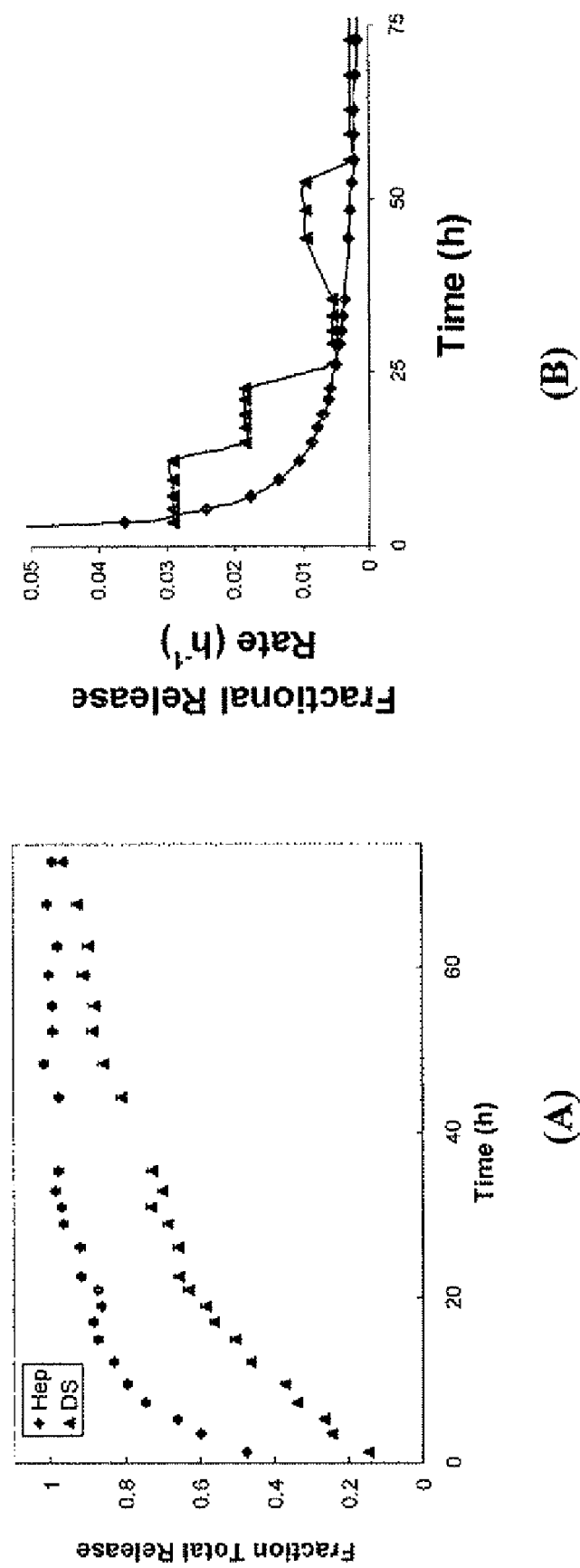
FIG. 24 is a graph illustrating that dextran sulfate (base layer, triangle) and heparin (surface layer, diamond)-loaded layers according to an exemplary embodiment, without dividing layers, sustain simultaneous release. (A) Fraction of mass released versus degradation time (error bars are small). (B) Fractional release rate versus time.
Figure 25:
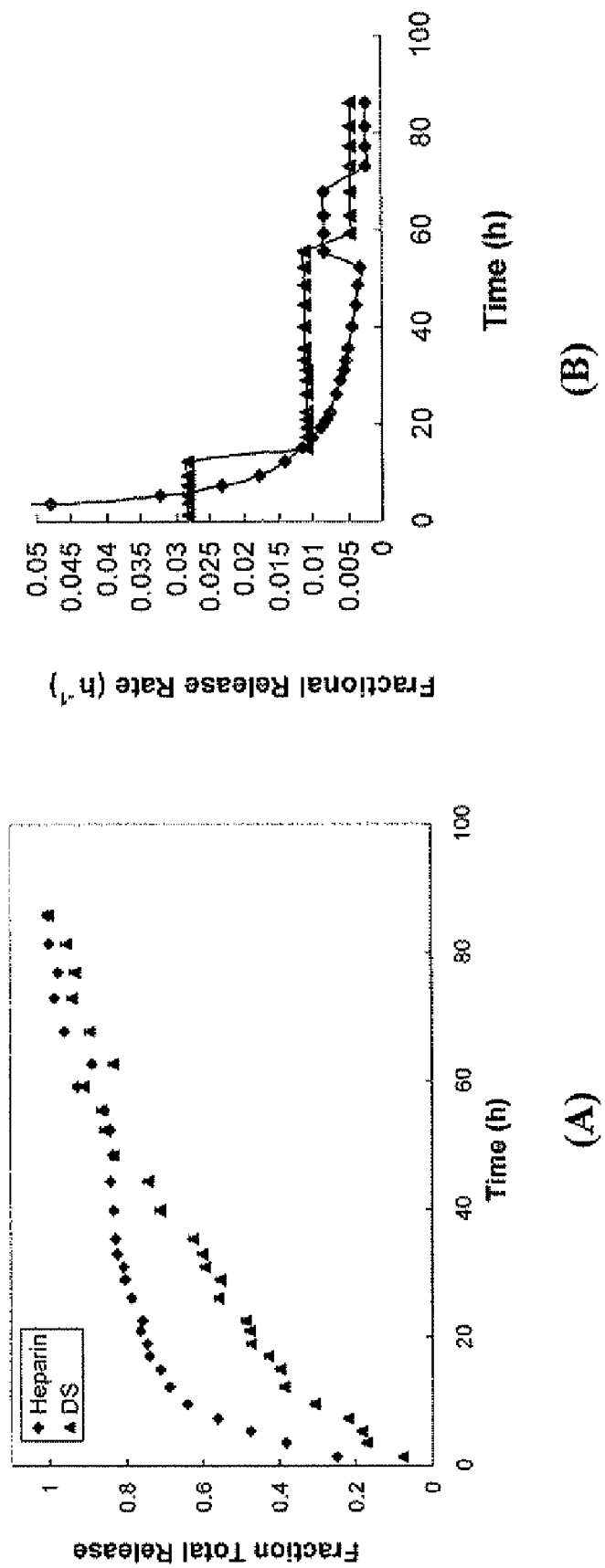
FIG. 25 is a graph illustrating that dextran sulfate (base layer, triangle) and heparin (surface layer, diamond)-loaded layers according to an exemplary embodiment, separated by 50 (Poly1/SPS) degradable dividing layers, sustain simultaneous release. (A) Fraction of mass released versus degradation time (error bars are small). (B) Fractional release rate versus time.
Figure 26:
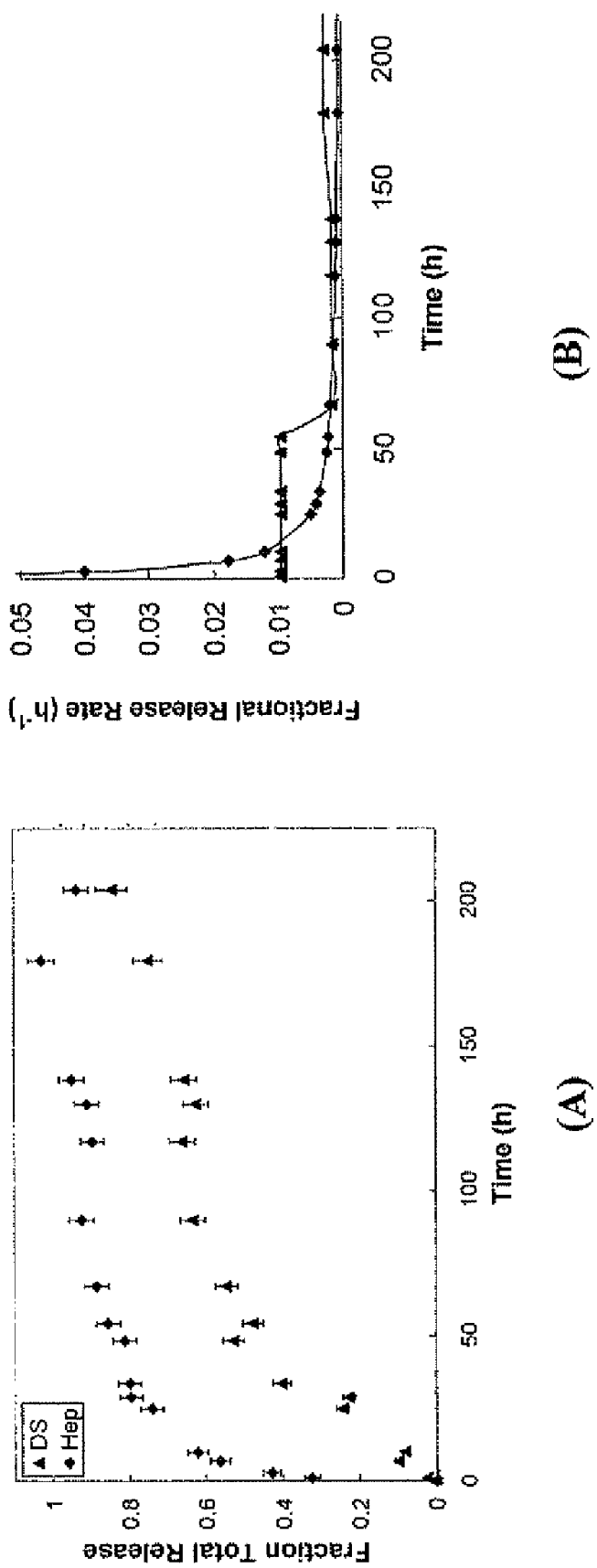
FIG. 26 is a graph illustrating that dextran sulfate (base layer, triangle) and heparin (surface layer, diamond)-loaded layers according to an exemplary embodiment, separated by 50 (PDAC/SPS) non-degradable dividing layers, sustain simultaneous release. (A) Fraction of mass released versus degradation time. (B) Fractional release rate versus time.
Figure 27:
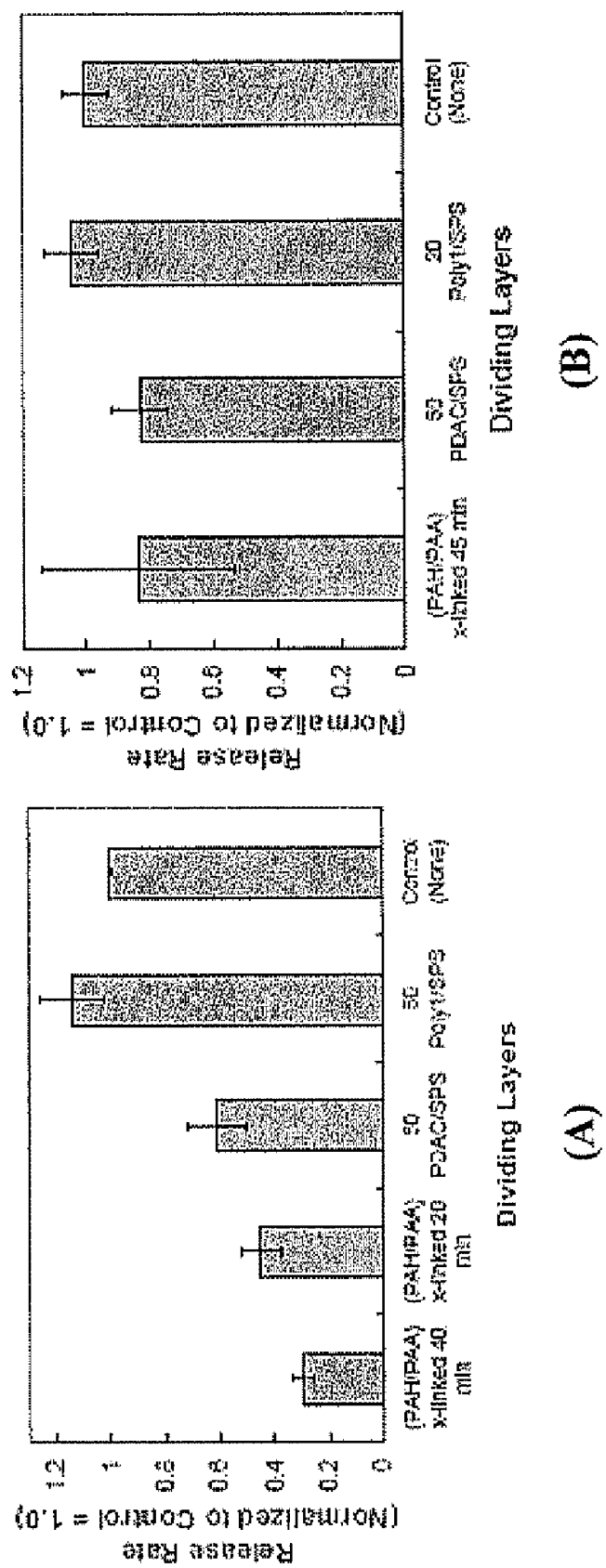
FIG. 27 is a graph illustrating the normalized initial average release rate ($\mu g/h\text{-}cm^2$) from base films according to an exemplary embodiment containing (A) dextran sulfate and (B) heparin coated with no separation layers (control), or with a single layer of (PAH/PAA) cross-linked at 215° C. for variable times, non-degradable (PDAC/SPS), or degradable (Poly 1/SPS). Initial average release rates were calculated from the average slope of the linear portion of the mass released versus time curve during the first 50 h (dextran sulfate) or 10 h (heparin) of degradation.

As shown in FIG. 19, when a base layer of polymer 1/DS was coated with a single thermally cross-linked bilayer of PAH/PAA (20 min at 215° C.), followed by the deposition of polymer 1/HEP, we observed a multi-stage, serial release of the surface heparin, followed by the underlying DS. Thus, the use of a single covalently cross-linked PAH/PAA layer was sufficient to separate the two components when deposited onto the surface of the linearly growing polymer 1/DS system, as evidenced by the two-stage release profile. Following a delay of approximately 25 h, the underlying DS was released with a linear profile. Interestingly, the average rate of DS release was approximately 60% slower than that observed in corresponding films without covalently cross-linked barrier layers. Additional experiments using single and multiple cross-linked PAH/PAA barrier layers show that both the duration of the release delay and the rate of release following this delay can be broadly controlled by adjusting the number of cross-linked bilayers and the degree of cross-linking, for example, by varying the time and temperature of cross-linking or the concentration of cross-linkable groups. For example, cross-linking multiple layers of PAH/PAA for longer than 1.5 h (at 215° C.) virtually halted the release of all underlying DS—no release of DS was observed for up to 45 days. This result may have important and direct applications in drug delivery, as it suggests that both the timing and rate of release of an underlying species can be broadly controlled using as little as a single cross-linked bilayer. Interestingly, we also found that when the order of the two labeled components was reversed (e.g., HEP as the base layer and DS as the surface layer), serial release was not observed even where a cross-linked spacer layer was employed. Without being bound by any particular theory, this may suggest that the nature of the base film onto which the cross-linked barrier layer is absorbed influences the final properties of the barrier layer (FIG. 23). The use of non-covalent (noncrosslinked) barrier layers also resulted in simultaneous release of both components (see FIGS. 20-26). In some cases, the barrier layers failed to even slow the release of the initially deposited base layers (FIG. 27). These results were unaltered by changes in pH, ionic strength, and the number of deposited barrier layers (data not shown). This finding contrasts with a recent study that showed that compartmentalized films containing linearly (e.g., film thickness increases proportionally with the number of layers) and exponentially growing regions (e.g., film thickness increases faster than the number of layers) could be constructed simply by depositing different films directly on top of one other (Garza, et al. (2004) *Langmuir* 20, 7298-7302). Without being bound by any particular theory, this suggests that additional factors, such as the polymer system, molecular weights, deposition condition, and other factors outside of the nature of growth that a given system exhibits may powerfully influence the final film architecture.

FIG. 27A illustrates the effect of barrier layers on the average release rate from the exemplary two-component systems described above. It is apparent that the average release rate (taken as the average slope of the initial, linear portion of the release curve) of systems including of an underlying layer of linearly-growing DS can be broadly controlled using both multiple layers of a nondegradable system PDAC/SPS or as little as a single layer of cross-linked PAH/PAA. Further, by tuning any of the parameters affecting the degree of cross-linking (e.g., cross-linking time, temperature, number of cross-linked layers), the release rate can be dramatically altered. For example, cross-linking times of greater than 1.5 h at 215° C., as well as barriers containing more than five cross-linked layers, resulted in one to two order of magnitude decreases in release rate (data not shown). Thus, milder cross-linking conditions (e.g., lower temperatures) may allow for a greater degree of flexibility in tailoring release profiles. Further, aqueous, chemical cross-linking techniques using common biochemical reagents such as carbodiimides may represent a suitable alternative to thermal cross-linking when low temperature fabrication is required. Nevertheless, one skilled in the art will recognize that a range of approaches may be employed to control the release of underlying species, particularly when the underlying species lacks the ability to diffuse throughout the film.

One skilled in the art will observe that control of the mechanisms of build-up and diffusion within a given system facilitates the engineering of stratified, multi-compartment architectures with complex release profiles that may be broadly controlled to suit the demands of a particular application. FIGS. 19 and 27 reveal numerous principles for the manipulation of diffusion and release from multi-component, hydrolytically degradable LbL films. First, when initially deposited layers contain a highly diffusible species such as HEP, subsequent deposition of additional layers has little to no effect on its release, as the diffusible species is likely able to migrate through even tightly interacting networks within the film, effectively ensuring that it always resides near the film surface (Picart, et al., (2002) *Proc Natl Acad Sci USA* 99, 12531-12535). However, when initially deposited layers contain a linearly growing species such as DS, subsequent deposition of new species can have a significant impact on its release, as the linearly growing system provides a structural substratum on which a tightly interacting network of barrier layers can be formed. The barrier layers in turn may delay the release of this species during degradation by physically separating it from subsequently adsorbed species.

The released entity need not serve as a structural component of the film (see FIGS. 19 and 27). As noted above, polyelectrolytes may be associated or mixed with polymeric or non-polymeric moieties to regulate the degradation rate. In addition, neutral, zwitterionic, or charged biomolecules, small molecules, or bioactive agents may be associated or mixed with a polycation or polyanion and incorporated into a layer. For example, the charged atoms on a zwitterionic molecule may facilitate electrostatic interactions with both the polyanionic and polycationic layers. A zwitterionic biomolecule, small molecule, or bioactive agent may be combined in solution with the polyelectrolytes for one of the layers or placed in a separate solution to form a "sandwich" between two layers. When the thin film degrades, the biomolecule, small molecule, or bioactive agent will be released. Alternatively, a biomolecule, small molecule, or bioactive agent may be associated with a polyelectrolyte under conditions which facilitate a strong interaction between the molecule and the polyelectrolyte, while the medium in which the biomolecule, small molecule, or bioactive agent is released is one which competes with the polyelectrolyte for the biomolecule, small molecule, or bioactive agent, thereby decreasing the strength of the interaction with the polyelectrolyte.

The composition of the various layers may be adjusted to release different entities as the thin film degrades. For example, a thin film may be designed to release a chemotactic factor tailored to attract cells to an implant site for a specified number of layers, followed by a growth factor tailored to stimulate a desired metabolic or proliferative activity in cells now at the implant site.

It will be appreciated that in preparing a thin film that degrades with a desired rate and profile, one may need to test various thin film compositions experimentally. The degradation rates and profiles of inventive thin films can, for example, be investigated using a variety of known techniques, including ellipsometry, dynamic light scattering (DLS), zeta-potential analysis, quartz crystal microbalance (QCM), and atomic force microscopy (AFM). The QCM method is particularly attractive since it can be used with rough films and allows continuous monitoring without removal of the thin films from the degradation milieu. AFM can be also used to monitor changes in the multi-layer surface morphology as a function of degradation.

Figure 7:
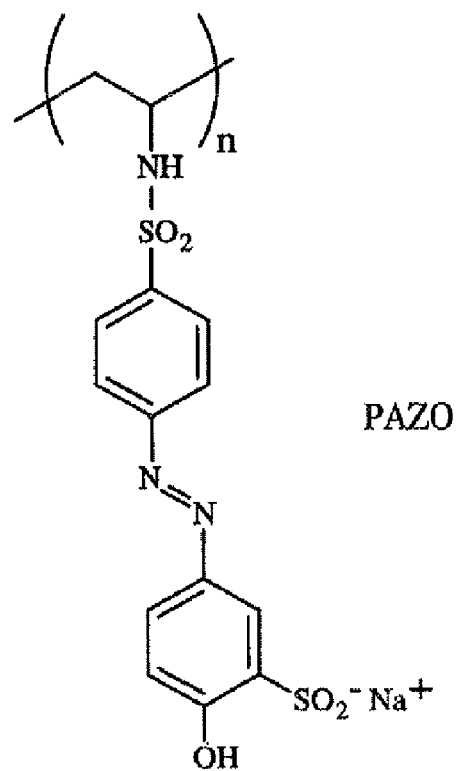
FIG. 7 depicts the chemical structure of PAZO, an azobenzene functionalized photochromic polyanion.

Additionally or alternatively, one may choose to monitor the rate at which a non-degradable structural polymer, biomolecule, small molecule, or bioactive agent is released from the thin film. If the released entity absorbs or emits light in an uncrowded region of the ultraviolet or visible electromagnetic spectrum, one could measure the rate of release by UV-visible spectroscopy. It will be appreciated that a variety of synthetic and recombinant techniques exist that allow one to attach a light absorbing or emitting group, e.g., a fluorescent group or a dye to a polymer or small molecule that lacks such functionality. Alternatively, one could incorporate a model chromic compound, e.g., the commercially available photochromic polyanion PAZO (see FIG. 7), into a range of thin films for this purpose. Radioisotopes may also be used to label components of the films, following which the activity of a solution containing the released material may be measured using techniques known to those of skill in the art.

The thin film may also be used to create a degradable substrate for cell seeding and culture. Some cells, for example, chondrocytes, proliferate better when deposited on a substrate to which they can attach. However, to use these cells in other applications, they may need to be separated from the substrate. Cells may be deposited on the surface of a multi-layer thin film and maintained in vitro. As the thin film degrades, the cells are released into the surrounding medium, freeing them for seeding onto tissue engineering matrices or for analysis. Integrins and cell adhesion sequences (e.g., the RGD sequence) may be included in the top layer or layers of the film to facilitate cell adhesion. Integrins are part of a large family of cell adhesion receptors which are involved in cell-extracellular matrix and cell-cell interactions. The RGD sequence, present in proteins such as fibronectin, has been shown to be active in promoting cell adhesion and proliferation (see Massia et a, *J. Cell. Biol.* 14:1089, 1991).

The thin films may include electroactive polymers. In the presence or absence of a voltage, conductive polymers may enhance the proliferation and metabolism of cells deposited thereon (see U.S. Pat. Nos. 6,095,148, issued Aug. 1, 2000, and 6,190,893, issued Feb. 20, 2001). The voltage may be an externally applied voltage. Alternatively, a voltage may be applied by native tissue, for example, nerve. Bone is piezoelectric, and physiologic loading will generate a potential across a film implanted therein. Exemplary electroactive polymers include, but are not limited to, polypyrrole, poly(p-phenylene), poly(p-phenylene vinylene), polythiophene, polyaniline, polyporphyrin, polyheme, and derivatives thereof. These polymers may be derivatized. For example, hydrocarbon groups, methoxy, cyano, phenyl, alkoxy, amino, and halides may be added to aromatic groups in the polymer, and except for halides (which would lead to the production of poly(phenylene acetylene)), to the non-aromatic carbons. Of course, if the film is intended for biological applications, the resulting derivative should be biocompatible.

The invention call employ a wide range of cell types and is not limited to any specific cell type. Examples of cell types that may be used include but are not limited to bone or cartilage forming cells such as chondrocytes and fibroblasts, other connective tissue cells, epithelial cells, endothelial cells, blood vessel cells, cancer cells, organ cells such as hepatocytes, islet cells, kidney cells, intestinal cells, and lymphocytes, smooth muscle cells, skeletal muscle cells, heart muscle cells, nerve cells, and stem cells such as human embryonic stem cells or mesenchymal stem cells.

In another embodiment, the thin film may encapsulate a decomposable substrate (e.g., a drug nano- or micro-crystal). Additionally or alternatively, the thin film may be exploited to regulate diffusion of the substrate into the surrounding medium. In certain embodiments, particularly for drug delivery, it may be desirable to target an encapsulated substrate to a particular cell or tissue. A variety of agents that can direct an encapsulated substrate to particular cells are known in the art (see, for example, Cotten et al., *Methods Enzym.* 217.618, 1993). Examples of useful targeting agents include, but are not limited to, low-density lipoproteins (LDLs), transferrin, asiaglycoproteins, gp120 envelope protein of the human immunodeficiency virus (HIV), toxins, antibodies, and carbohydrates. Certain exemplary encapsulated substrates include one or more targeting agents that are associated with polyelectrolyte components of the inventive thin film and/or with the entity to be released.

The substrate geometry may be manipulated to deposit films having a variety of shapes. For example, films may be deposited on particles, tubes, or spheres to facilitate a more uniform release distribution. Films may be deposited on strands such as sutures to release factors such as analgesics or antibiotics at a surgical site. Alternatively, these films may be deposited onto capillary networks or tissue engineering constructs. For example, a thin film deposited on a three-dimensional tissue engineering construct may be used to attract cells to a newly implanted construct and then to promote specific metabolic or proliferative activity.

Figure 8:
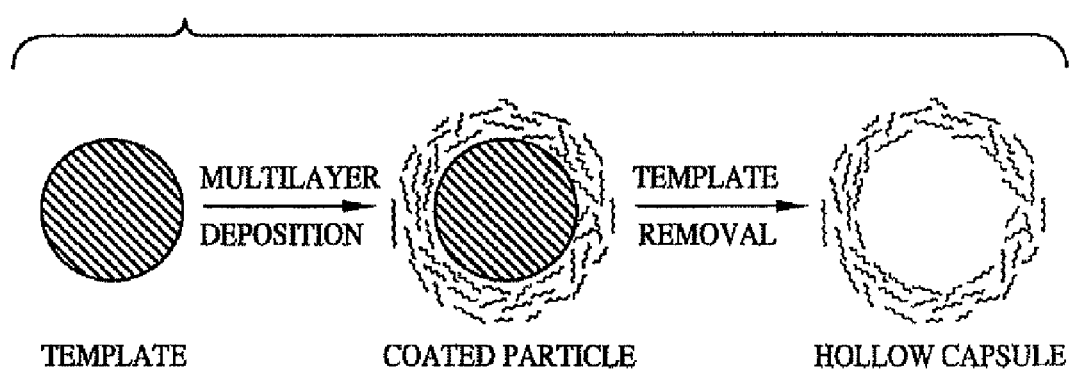
FIG. 8 is a schematic illustrating the deposition of a decomposable thin film on a particulate template and construction of a decomposable hollow thin film microcapsule by dissolution of the template.
Figure 9:
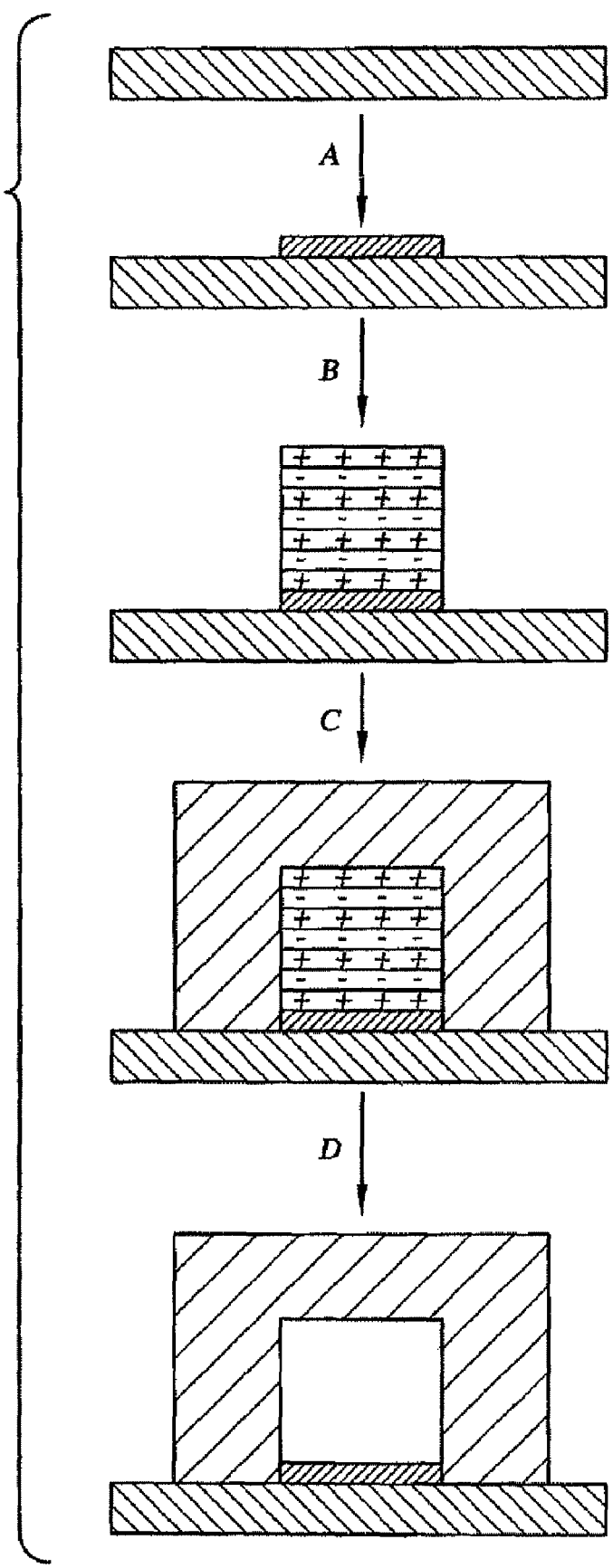
FIG. 9 is a schematic illustrating the construction of a tunnel-like microstructure according to one embodiment of the invention by (A) deposition of an ionic or polar self-assembled monolayer (SAM), e.g., by micro-contact printing, (B) layer-by-layer deposition of a decomposable thin film, (C) flooding of the substrate with a non-degradable material, and (D) decomposition of the thin film.

The methods of the invention may also be used to create three-dimensional microstructures. For example, the thin film may be deposited on a substrate that can be dissolved to leave a hollow shell of the thin film (see FIG. 8). Alternatively, multi-layers may be deposited having regions that are more and less degradable. Degradation of the degradable portions leaves a three-dimensional microstructure (see FIG. 9). In a first step, the surface of a substrate is divided into regions in which LBL deposition of an inventive thin film is more or less favorable (see FIG. 9, step A). In one embodiment, a pattern of self-assembled monolayers (SAMs) is deposited on a substrate surface by microcontact printing (see, for example, U.S. Pat. No. 5,512,131 to Kumar et al., see also Kumar et al., *Langmuir* 10:1498, 1994; Jiang and Hammond, *Langmuir,* 16:8501, 2000; Clark et al., *Supramolecular Science* 4:141, 1997; and Hammond and Whitesides, *Macromolecules* 28:7569, 1995). In preferred embodiments, the substrate surface is neutral and the exposed surface of the deposited SAMs is polar or ionic (i.e., charged). A variety of polymers with polar or ionic head groups are known in the art of self-assembled monolayers. In another embodiment, a uniform coating of a polymer is deposited on a substrate, and that coating is transformed into a patterned layer by means of photolithography. Other embodiments are also contemplated in which the substrate surface is selectively exposed to plasmas, various forms of electromagnetic radiation, or to electron beams, In yet other embodiments, the substrate may possess the desired surface characteristics by virtue of its inherent composition. For example, the substrate may be a composite in which different regions of the surface have differing compositions, and thus different affinities for the polyelectrolyte to be deposited.

In a second step, polyelectrolyte layers of alternating charge are deposited by LBL on receptive regions of the surface (see FIG. 9, step B) as described for a homogeneous surface above and selective regions in Jiang and Hammond, *Langmuir,* 16:8501, 2000; Clark et al., *Supramolecular Science* 4:141, 1997; and Hammond and Whitesides, *Macromolecules* 28:7569, 1995. The surface is subsequently flooded with a non-degradable polymer (see FIG. 9, step C) and placed in a medium wherein at least a portion of the polyelectrolyte layers degrade, thereby creating a three-dimensional "tunnel-like" structure that reflects the pattern on the original surface (see FIG. 9, step D). It will be appreciated that more complex microstructures could be created based on these simple principles (e.g., by depositing SAMs with different electrostatic character in different regions of a substrate surface and/or by iterative additions of subsequent structures above the deposited non-degradable polymer).

Examples

Fabrication of Poly 1/SPS, Poly 1P/AA, and Poly 1/DNA Films

Figure 10:
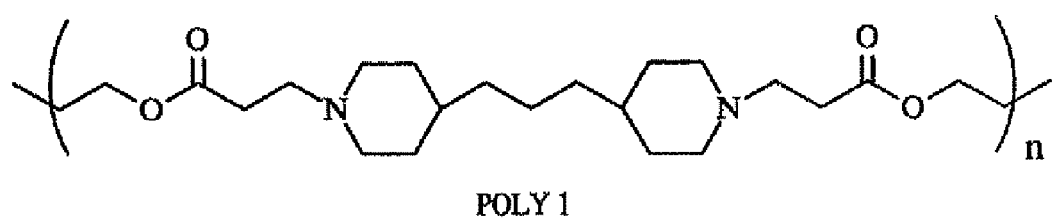
FIG. 10 depicts the chemical structure of Polymer 1 (Poly 1), a hydrolytically degradable poly(β-amino ester)

Polymers: The poly(β-amino ester) "Poly 1" (FIG. 10) was selected for use in initial experiments based on the relatively slow degradation rate of this polymer at acidic pH ($t_{1/2}$>10 h at pH=5.1, 37° C.) (Lynn, D. M., et al., *J. Am. Chem. Soc.,* 122:10761-10768, 2000). As Poly 1 has also been shown to form electrostatic complexes with polyanions such as DNA in solution, we hypothesized that it would readily absorb to negatively-charged surfaces and model polyanions such as poly(styrene sulfonate) (SPS) and poly(acrylic acid) (PAA) commonly used for LBL assembly.

Poly(sodium 4-styrenesulfonate) ("SPS"), MW~70,000 and highly polymerized calf thymus DNA were obtained from Sigma-Aldrich, St Louis, Mo. Linear poly(ethylene imine), "LPEI", MW~25,000, poly(dimethyldiallylammonium chloride) "PDAC", MW~240,000) and poly(acrylic acid), "PAA", MW~90,000 were obtained from Polysciences, Warrington, Pa. Poly 1 (see FIG. 10, MW~10,000), was synthesized as described in Lynn et al., *J. Am. Chem. Soc.* 122:10761-10768, 2000, the contents of which are hereby incorporated by reference. All polyelectrolytes were used without further purification or filtration, with the exception of Poly 1. Poly 1 solutions were filtered using a 0.45 μm membrane syringe filter prior to use. All polymer solutions used for deposition were pH adjusted to 5.1 with a concentration of 5 mM for Poly 1 and 20 mM for all other polyelectrolytes (calculations based on monomer unit). Poly 1 was dissolved in a 100 mM sodium acetate buffer. Other solutions were prepared with deionized water and the pH was adjusted using sodium hydroxide and hydrochloric acid.

Other Chemicals: The water used for all experimental procedures was obtained from a Milli-Q Reagent Water System (Millipore, Bedford, Mass.) at 18.2 MΩcm. For degradation, PBS buffer pH 7.4 (0.1 mM $Na_2HPO_4$, 150 mM NaCl, 0.027 mM KCl), 100 mM sodium acetate buffer pH 5.1 and TAE buffer pH 8.3 (0.4 mM Tris-acetate and 0.01 mM EDTA) were used. All buffered solutions used for decomposition were salt (NaCl) adjusted to 150 mM to maintain a physiologically relevant salt concentration.

Polyelectrolyte Deposition: Silicon substrates were cut to approximately 1 cm×2 cm and rinsed with acetone and ethanol. They were then dried using a nitrogen stream and plasma etched to remove any organic materials and to charge the surface with oxygen radicals. Glass substrates underwent the same procedure. The optical constants (Ns and Ks) for the substrates were then obtained from a Gaertner Variable Angle Ellipsometer (6328 nm, incident angle=70°). Data were collected and processed using the Gaertner Ellipsometry Measurement Program (GEMP), Version 1.2 software package.

Substrates were then placed in a Carl Zeiss HMS Series Programmable Slide Stainer (Carl Zeiss, Thornwood, N.Y.) where ten precursor bilayers (ca. 100-200 Å) of LPEI/SPS or PDAC/PAA were deposited, terminating with the polyanion monolayer. This was done to assure a strong known net charge on the surface. After measuring the film thickness using ellipsometry, ten bilayers of Poly 1/SPS or Poly 1/PAA were deposited on top of the original film.

The slide stainer was programmed to submerge the substrates in the polycation solution for five minutes and then to rinse the substrates in two successive deionized water baths. The first rinse was of one minute and the following of two minutes and thirty seconds. The substrates were then submerged five more minutes in the polyanion solution and then rinsed in the same manner. After one bilayer was deposited, the substrates were ultra sonicated for four minutes and thirty seconds. Without being bound by any particular theory, this ultra sonication step is believed to improve the surface's topography. The program was then cycled to obtain the desirable bilayers of film.

After deposition, films were dried with nitrogen to remove visible drops of solution from the surface before ellipsometry or profilometry was performed. Multilayers incorporating poly 1 were removed from aqueous water baths immediately after final layers were deposited, dried under a stream of dry nitrogen, placed in a vacuum dessicator and dried overnight to minimize degradation due to incorporated water. Root mean square roughness was determined using a Tencor Corporation KLA Model P10 Surface Profilometer with a 2 um stylus. Reflective FTIR spectra were recorded using a Nicolet Magna-IR 550 Series II Spectrometer. Substrates to be used for reflective FTIR analysis were coated with a thin layer of gold using a thermal evaporator. The substrates were submerged in buffered solutions at room temperature or 37° C. and the decomposition followed by ellipsometry or UV-visible spectroscopy at desired time intervals. The thickness of each sample was determined by ellipsometry at nine different predetermined locations on the substrate surface (measured in triplicate), and the sample was returned to the buffer solution.

Figure 11:
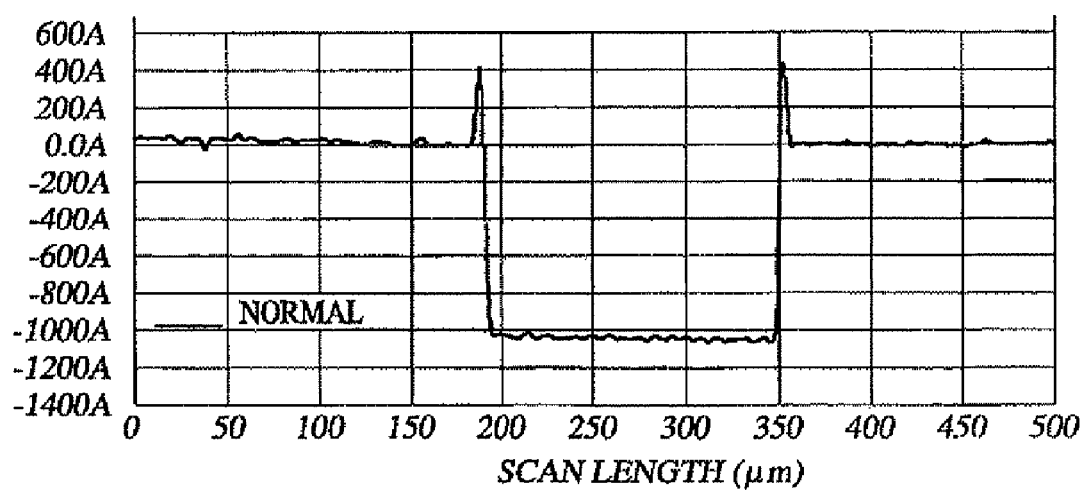
FIG. 11 is a profilometry scan of ten bilayers of Poly 1/SPS deposited on ten precursor bilayers of LPEI/SPS.
Figure 12:
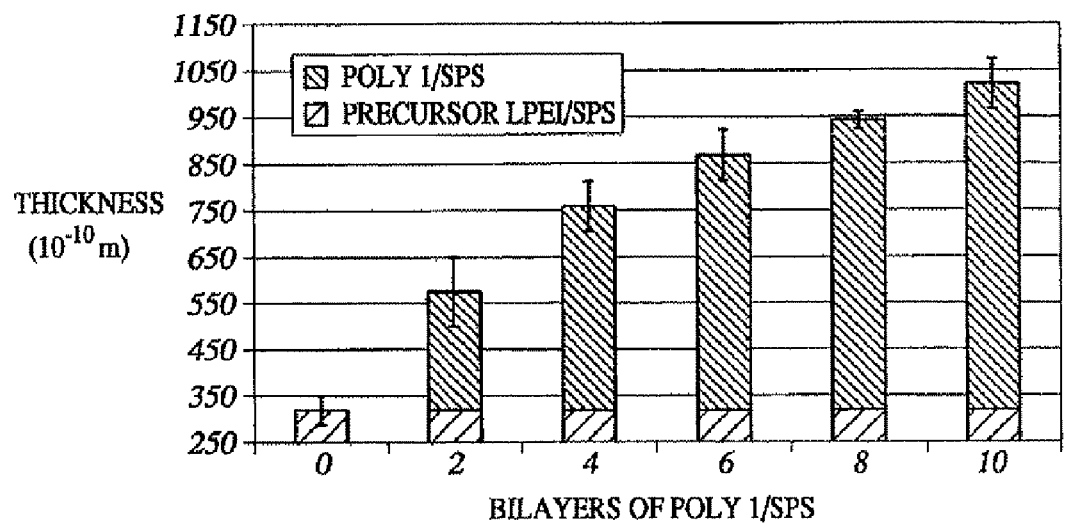
FIG. 12 illustrates the thickness change as bilayers of Poly 1/SPS are deposited on ten precursor bilayers of LPEI/SPS.

Growth of Poly 1/SPS and Poly 1/PAA films: The deposition of multi-layer films was followed by ellipsometry as well as profilometry (see FIG. 11). Poly 1/SPS films composed of 10 bilayers (on top of the 10 substrate bilayers) were determined to be around 1000 Å thick by profilometry and around 1400 Å thick using ellipsometry. Bilayer growth proved to be directly proportional to film thickness (see FIG. 12). Films formed from 10 bilayers of Poly 1/PAA films were thicker than those formed from Poly 1/SPS (around 6000 Å). These results are consistent with previous studies showing a relationship between film thickness and pH for weak polyacid systems (Shiratori, S. S., et al., Macromolecules, 33:4213-4219, 2000). The films formed from both polymer systems were extremely smooth considering their thickness; the root mean square roughness (RMS) for both systems obtained by profilometry ranged from 16.9 Å to 60.2 Å.

Figure 13:
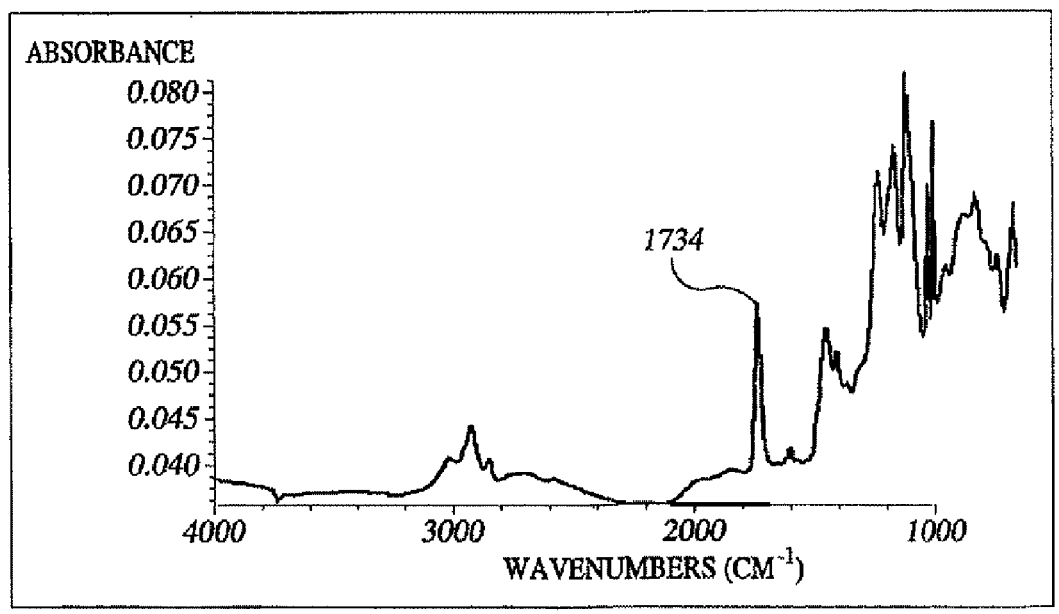
FIG. 13 is a reflective FTIR scan of ten bilayers of Poly 1/SPS deposited on ten precursor bilayers of LPEI/SPS on a gold substrate (1734 cm$^{-1}$ carboxyl stretch indicated)

To verify that Poly 1 was being incorporated in the films, Poly 1/SPS films were grown on gold substrates for analysis by reflective FTIR. The observation of a strong peak between 1725 and 1750 $cm^{-1}$ corresponding to the carboxyl stretch of Poly 1 confirms the presence of Poly 1 in the films (see FIG. 13). The Poly 1/SPS system was selected for the FTIR, rather than the Poly 1/PAA systems, to prevent the carboxyl group of the PAA from obscuring the CO stretch in Poly 1.

Figure 14:
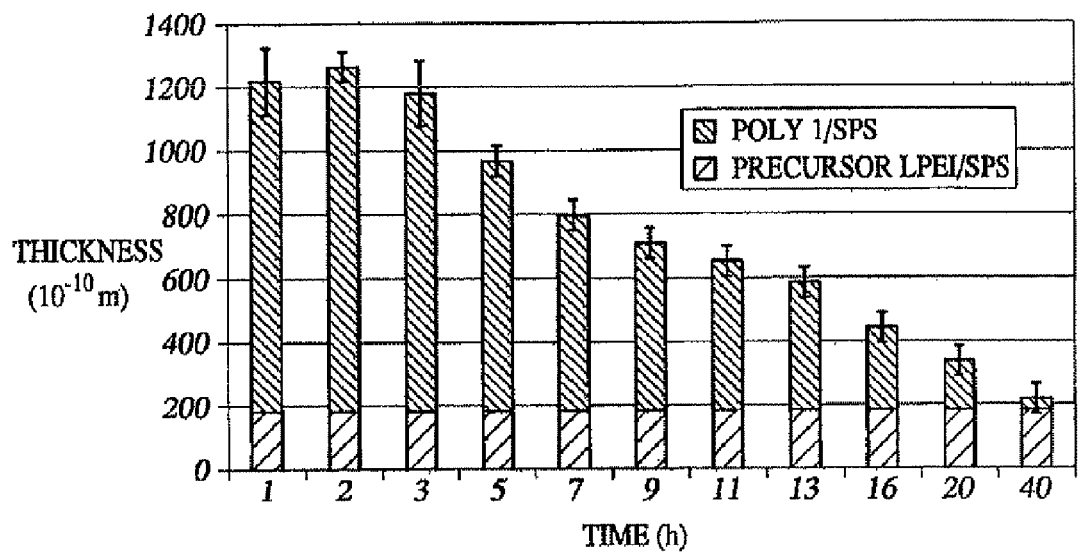
FIG. 14 illustrates the decomposition in PBS buffer at pH 7.4 (at 37° C.) of a thin film comprising Poly 1/SPS bilayers deposited on precursor bilayers of LPEI/SPS.
Figure 15:
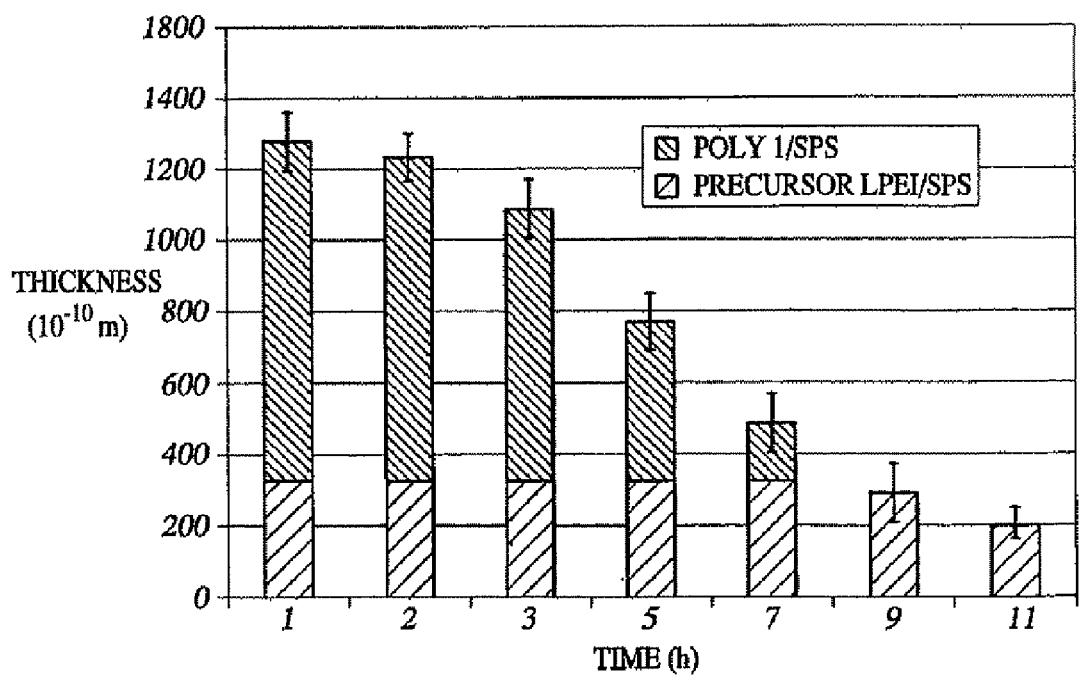
FIG. 15 illustrates the decomposition in TAE buffer at pH 8.3 (at 37° C.) of a thin film comprising Poly 1/SPS bilayers deposited on precursor bilayers of LPEI/SPS.

Decomposition of Poly 1/SPS and Poly 1/PAA films: Once procedures for the construction of films using Poly 1 were optimized, experiments to investigate film decomposition were performed. Films were incubated at pH 5.1, 7.4 and 8.3 in order to examine decomposition at pH and temperature values likely to be encountered in controlled release applications. Poly 1/SPS films decomposed over a 40-hour period in PBS pH 7.4 at 37° C. (see FIG. 14). Interestingly, decomposition appeared to occur by surface erosion and films remained smooth and consistent throughout the decomposition process, allowing decomposition to be monitored conveniently by ellipsometry. In general, the rate of decomposition increased with increasing pH. Poly 1/SPS films placed in TAE buffer at pH 8.3 decomposed in under nine hours (see FIG. 15) and more slowly under acidic conditions. These pH/rate data are consistent with a hydrolytic mechanism of degradation and erosion, similar to that previously observed for polymer 1 in solution (Lynn, D. M., 2000). Poly 1 is insoluble in aqueous media at pH 7.4, suggesting that degradation or erosion is occurring via hydrolysis rather than decomplexation and dissociation of layers of Poly 1 at higher pH.

Film erosion rates were also dependent on the structures of the incorporated polyanions. For example, while 100 nm thick Poly 1/SPS films eroded completely over a period of 40 hours at pH 7.4 (FIG. 2), 600 nm films formed from Poly 1 and PAA degraded completely over a period of 9 hours under identical conditions. This behavior is consistent with the pH/dissolution profile observed for other weak polyacid multilayer systems, in which the increased ionization of PAA at elevated pH contributes to repulsive electrostatic interactions (Sukhishvili, S. A., et al., S. Macromolecules, 35:301-310, 2002; Sukhishvili, S. A., et al., J. Am. Chem. Soc., 122:9550-9551, 2000). Additionally, films containing thick layers of PAA often possess a lower overall effective crosslink density than more compact films constructed from strong polyelectrolytes such as SPS (Shiratori, S. S., 2000; Lvov, Y., et al., Langmuir, 9:481-486, 1993); the less crosslinked morphology may support more rapid permeation of water and breakdown of the polymer layers.

The ellipsometric data in FIG. 2 suggest that film erosion occurs gradually, rather than by the bulk deconstruction observed for weak polyacid or salt-deconstructed systems (Sukhishvili, S. A., 2002; Sukhishvili, S. A., 2000; For general examples of salt-induced "deconstruction" of polyelectrolyte multilayers, see: Dubas, S. T.; Schlenoff, J. B., Macromolecules, 34:3736-3740, 2001; Schüler, C., et al., Biomacromolecules, 2:921-926, 2001). Preliminary AFM analysis of partially eroded films is also consistent with this gradual erosion process—surface roughness values for partially eroded films (RMS roughness—6.9 nm) were less than the thickness of an average bilayer (10 nm) and surfaces were consistent over 1 μm (Hammond, P. T., 1998) portions of the film. We continue to investigate the factors governing erosion at various length scales and spatial resolutions, as the ability to control erosion in a "top-down" manner could introduce significant advantages from a release standpoint and allow precise control over the sequences by which one or more incorporated components are released. The different decomposition rates provide a potential means for controlling the exact decomposition rates of films by customization with these two or any other polyanions.

Controlled release of DNA from Poly 1/DNA films: Preliminary experiments designed to explore the application of these decomposable thin films to the controlled release of polyanions were done by adsorbing polyanionic dyes and calf thymus DNA into the decomposable polymeric films. Adsorption of DNA by electrostatic layer-by-layer deposition was achieved by the negative charge of the phosphate-sugar group that composes the helix. Poly 1/DNA films were deposited on silicon substrates previously prepared with ten precursor bilayers of LPEI/SPS. These films were measured by ellipsometry and film thickness ranged from 800 Å to 1000 Å

Figure 16:
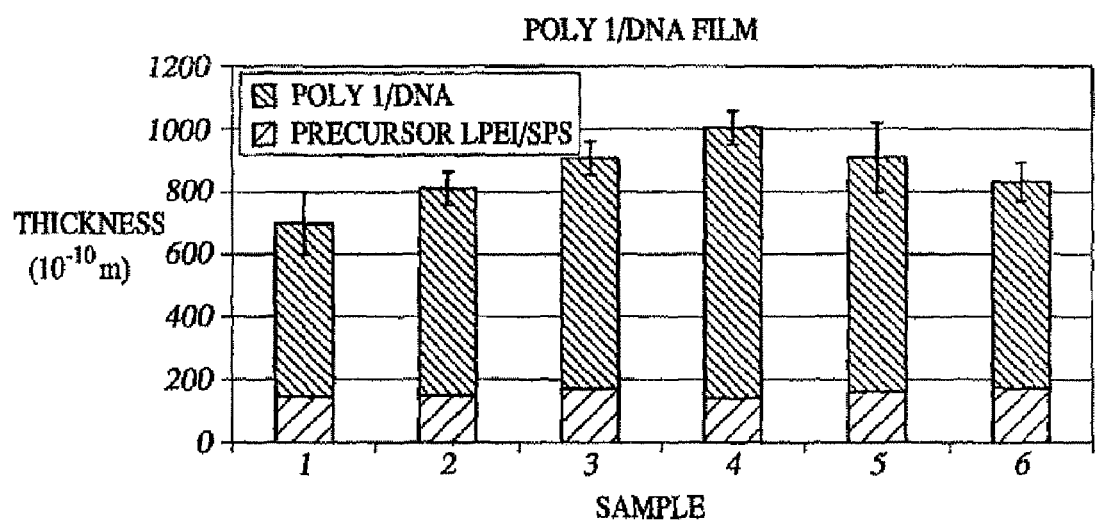
FIG. 16 illustrates the thickness of six different thin films comprising Poly 1/DNA bilayers deposited on ten precursor bilayers of LPEI/SPS.
Figure 17:
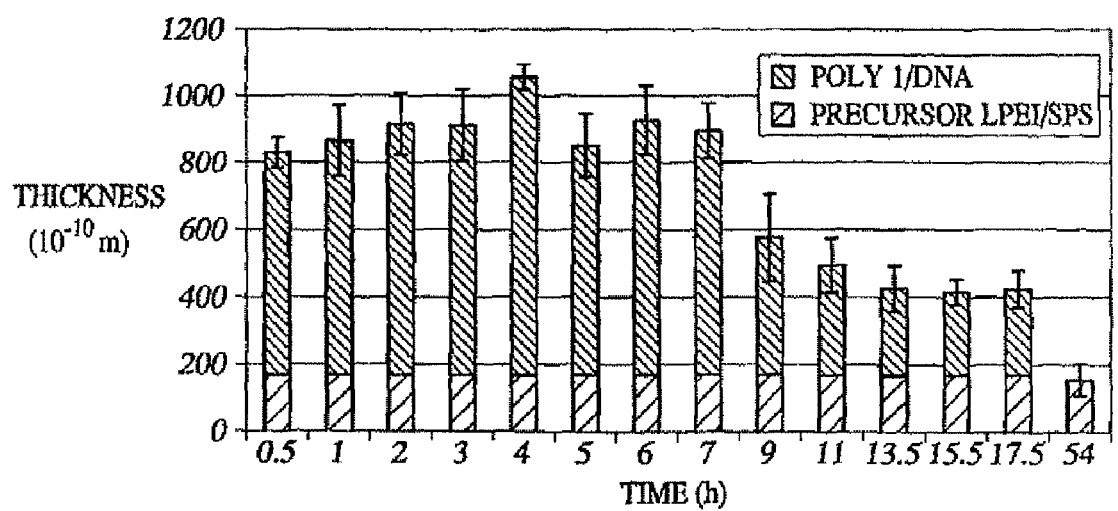
FIG. 17 illustrates the decomposition in PBS buffer at pH 7.4 (at 37° C.) of a thin film comprising Poly 1/DNA bilayers deposited on precursor bilayers of LPEI/SPS.

(see FIG. 16). Poly 1/DNA films decomposed over a 50-hour period in PBS buffer pH 7.4 at 37° C. (see FIG. 17).

Build Up and Release Properties of Single Component Films

Materials. Polymer 1 ($M_n$=10000) was synthesized as previously described (24). Briefly, equal parts of diacrylate and diamine were dissolved at about 750 mmol in THF. After stirring at 50° C. for about 48 hours, the reaction mixture was cooled to room temperature and dropped slowly into vigorously stirred diethylether or hexanes. The resulting polymer was collected and dried under vacuum. Heparin sodium salt ($M_n$=12500) was obtained from Celsus Laboratories (Cincinnati, Ohio). Dextran sulfate sodium salt ($M_n$=8000), poly(sodium 4-styrenesulfonate) (SPS, $M_n$=1000000), poly(allylamine hydrochloride) (PAH, $M_n$=70000), and poly(diallyldimethylammonium chloride) (PDAC, $M_n$=100000) were obtained from Sigma-Aldrich (St. Louis, Mo.). Linear poly(ethylenimine) (LPEI, $M_n$=25000) and poly(acrylic acid) (PAA, $M_n$=90000) were purchased from Polysciences, Inc (Warrington, Pa.). Silicon wafers (test grade n-type) were purchased from Silicon Quest (Santa Clara, Calif.). $^3$H-heparin sodium salt (1 mCi, 0.30 mCi/mg, $M_n$=12500) and $^{14}$C-dextran sulfate sodium salt (100 µCi, 1.5 mCi/g, $M_n$=8000) were obtained from American Radiolabeled Chemicals, Inc. Radiolabeled and corresponding unlabeled polymers were chosen with similar molecular weights and polydispersities in order to mimic the behavior of the unlabeled species as closely as possible. All materials and solvents were used as received without further purification.

General Considerations. A Harrick PDC-32G plasma cleaner was used to etch silicon substrates (3 cm×2 cm) following rinsing with methanol and deionized water and drying under a stream of dry nitrogen. Layer-by-layer thin films were deposited using an automated Carl Zeiss HMS Series Programmable Slide Stainer. Absorbances from growing films were measured using Fourier Transform Infrared Spectroscopy (FTIR) using a Nicolet Magna IR 550 Series II Spectrometer. Zinc selenide substrates used for transmission FTIR analysis were prepared using the same method employed for silicon substrates, Ellipsometric measurements for film thickness were conducted using a Gaertner Variable Angle Ellipsometer (6328 nm, 70° incident angle) and Gaertner Ellipsometer Measurement Program (GEMP) Version 1.2 software interface. The release of radiolabeled polymers was quantified using a Tri-carb liquid scintillation counter (Model U2200). The amount of radiolabel in each sample vial was measured using $^3$H, $^{14}$C, and dual counting protocols, each of which were shown to be both consistent and highly accurate over a broad concentration range (30-100,000 DPM/mL) in calibration experiments performed prior to drug release. (PAH/PAA) films were thermally cross-linked by incubating films in a Yamoto DVS400 gravity convection oven at 215° C. for indicated time intervals.

Thin Film Fabrication. All films were constructed from dilute aqueous solutions (2-10 mM) using the alternating dipping method (Decher, G. (1997) *Science* 277, 1232-1237). All polymers used in degradable thin films were prepared in 100 mM acetate buffer at pH 5.1 to avoid the conditions under which polymer 1 degrades rapidly ($t_{1/2}$>10 h at pH 5.1, 37° C.) (Lynn, 2000). Nondegradable base layers were deposited from dipping solutions of LPEI and PSS in deionized water pH adjusted to 4.25 and 4.75, respectively. Deionized water used to prepare all solutions was obtained using a Milli-Q Plus (Bedford, Mass.) at 18.2 MΩ. For degradation experiments, 1×PBS buffer (pH 7.4, 137 mM NaCl, 2.7 mM KCl, 10 mM $Na_2HPO_4$) was used. Films used in this study were constructed on either silicon (for ellipsometry and degradation studies) or zinc selenide (for transmission mode FTIR) planar substrates. In all cases, degradable, polymer 1-based films were constructed directly on top of ten bilayer, nondegradable base films containing linear poly(ethylenimine) (LPEI) and sulfonated poly(styrene) (SPS) to ensure uniform adhesion to the substrate. Following deposition, films were removed from rinsing baths and dried thoroughly under a stream of dry nitrogen to avoid premature degradation.

Thin Film Degradation Studies. All film degradation studies were performed as follows. Films were immersed in 20 mL of the appropriate buffer solution in a screw top glass vial and tightly sealed. At designated times, films were removed, dried thoroughly under a stream of dry nitrogen, and thickness was measured using ellipsometry at ten predetermined locations on the film surface (measurements were performed in triplicate). Following measurements, films were reimmersed in buffer solutions and resealed.

Release Studies. For drug release experiments, radiolabeled LbL thin films were first constructed by alternately depositing polymer 1 and the indicated radiolabeled drug(s). Radiolabled deposition solutions containing $^3$H-heparin were prepared by combining 1 mL of 50 µCi/mL $^3$H-heparin (0.30 mCi/mg, $M_n$=12500) with 35 mL of 100 mM acetate buffer. Unlabeled heparin ($M_n$=12500) was added to bring the total concentration of heparin (unlabeled plus labeled) to 2 mg/mL (1.5-2 µCi/mL $^3$H). Radiolabled deposition solutions containing $^{14}$C-dextran sulfate were similarly prepared by combining $^{14}$C-dextran sulfate (1.5 mCi/g, $M_n$=8000), unlabeled dextran sulfate ($M_n$=8000), and 100 mM acetate buffer to yield a total concentration of dextran sulfate (unlabeled plus labeled) to 2 mg/mL (1 µCi/mL $^{14}$C). After fabrication of the indicated films, drug release experiments were performed by immersing each film in 50 mL 1×PBS buffer in a 200 mL screw top vial. A 1 mL sample was extracted at indicated time points and analyzed by adding 5 mL of ScintiSafe Plus 50% (Fisher Scientific, Atlanta, Ga.) prior to measurement. Degradation vials were tightly capped between sample extractions to prevent evaporation of the buffer solution. Raw data (disintegrations per minute, DPM) were converted to micrograms (µg) of drug released using the conversion factor 2.2× $10^6$ DPM=1 µCi, the specific radioactivity of the drug, and our knowledge of the ratio of total drug to labeled drug in the deposition solution (Wood, et al. (2005) *Langmuir* 21, 1603-1609).

Release Profiles: Heparin (HEP) and dextran sulfate (DS) exhibit growth behavior associated with diffusive and non-diffusive species, respectively (Picart, 2002). FIG. 28A is a plot of the transmission mode FTIR absorbance recorded from films containing either (polymer 1/HEP) or (polymer 1/PS). Specifically, the absorbances from sulfonic acid groups at 1035 $cm^{-1}$ (heparin) and 1017 $cm^{-1}$ (dextran sulfate) were measured after the deposition of indicated bilayers. All measurements were taken from the same spot on the surface of the film in transmission mode. The inset shows the film thickness versus number of deposited bilayers for a (polymer 1/DS) film. Both FTIR and ellipsometry demonstrate that the quantity of DS incorporated into the film is linearly proportional to the number of adsorption cycles, a commonly observed characteristic of many LbL systems. Linear build-up behavior is characteristic of films whose constituent polyions adsorb directly onto the film surface during each deposition step. Interlayer diffusion does not occur in these systems, which as a result form spatially organized structures wherein species deposited at a given step are only able to interact with neighboring species that are in close proximity (e.g., 2-3 layers) (Decher, 1997; Hübsch, et al. (2004) *Langmuir* 20, 1980-1985; Lösche, et al. (1998) *Macromolecules* 31, 8893-8906). On the other hand, heparin-based films exhibit an exponential increase in absorbance with increasing numbers of adsorbed layers. Exponentially growing films, which often include hydrophilic polyelectrolytes or biologically-derived materials (i.e., peptides and polysaccharides), are poorly organized, blended architectures characterized by the complete "in" and "out" diffusion of adsorbing species throughout the growing film during the film's assembly process (Picart, 2002; Elbert, et al. (1999) *Langmuir* 15, 5355-5362; Picart, et al. (2001) *Langmuir* 17, 7414-7424; Lavalle, et al. (2002) *Macromolecules* 35, 4458-4465). A series of recent studies offer mechanistic explanations (Lavalle, 2002; Lavalle, et al. (2004) *J Phys Chem B* 108, 635-648) and direct evidence (Decher, 1997) for this process, wherein a species deposited at a given step can reside in any position throughout the film.

FIG. 28B depicts the chemical structures of the repeat units of polymer 1, HEP, and DS. Polymer 1 is a cationic, degradable poly (β amino ester) synthesized by the conjugate addition-step polymerization of a diamine and a diacrylate; it represents one member of a library of over 2350 degradable poly (β amino esters) recently synthesized and screened for their abilities to deliver DNA to cells in culture (Anderson, et al., (2003) *Angew. Chem. Int. Ed.* 42, 3153-3158). Both model drug compounds, HEP and DS, are polysaccharides that possess similar structural attributes, including strong (sulfonic) acid groups on each repeat unit and relatively low molecular weights.

Figure 29:
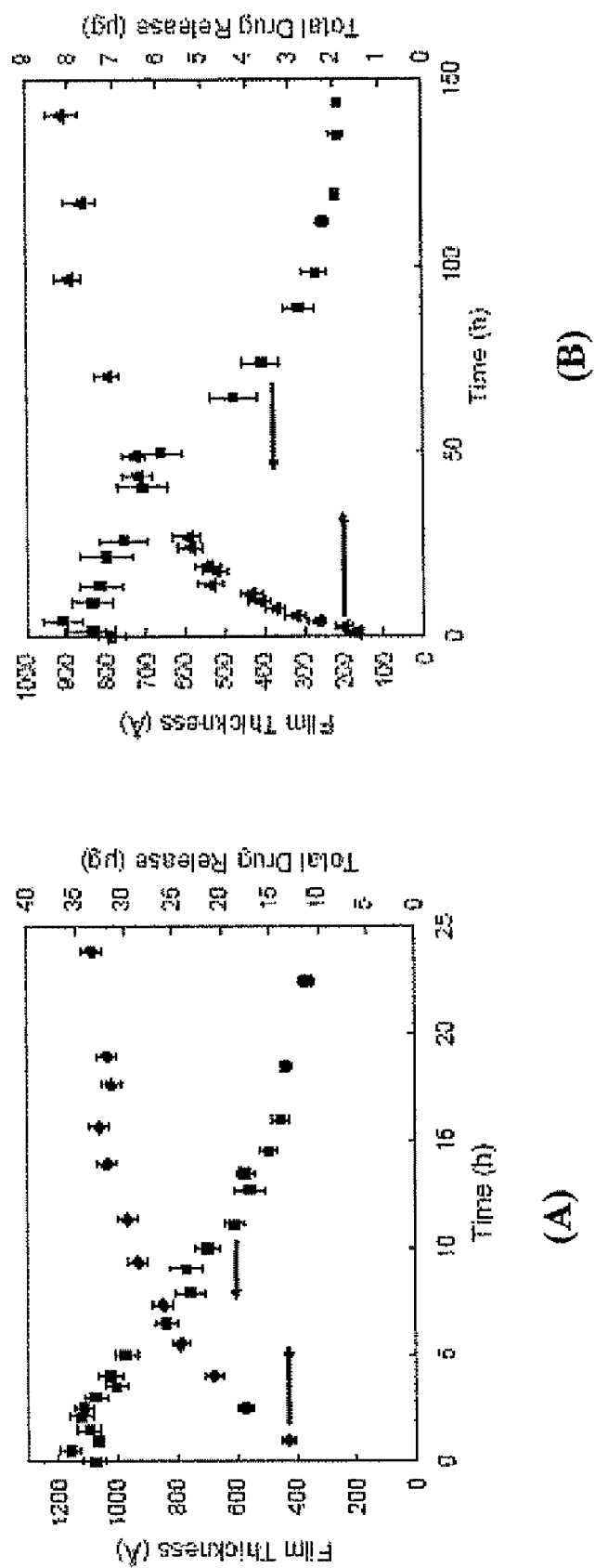
FIG. 29 illustrates degradation (square) and drug release (triangle) from single component films according to an exemplary embodiment (A) (polymer 1/HEP)20. (B) (polymer 1/DS)20.

To better understand the degradation and release behavior exhibited by the two model polyelectrolytes, we simultaneously measured release and degradation of single component films containing each species. FIGS. 29A and 29B show degradation and release from 20 bilayer (polymer 1/HEP) and polymer 1/DS) systems, respectively, following immersion in PBS buffer at pH 7.4. Complete degradation and consequent release from (polymer 1/HEP) systems occurred within 20 hours. Film thickness was observed to decrease linearly following a brief swelling period of 0.5-2.0 h on first exposure to aqueous solution (Wood, 2005). DS-based films exhibited similar degradation and release behavior, though with kinetics approximately five-fold slower than their HEP-based counterparts. Without being bound by any particular theory, the initial release observed in both cases within the first few hours of degradation likely reflects passive release from the surface, as the outermost layer of each film includes the labeled compound. The fact that this effect is more pronounced in the case of heparin may reflect the presence of interlayer diffusion, which results in a thick outer layer of diffusible material at the film surface (Decher, 1997). Interestingly, in both cases film thickness was observed to decrease linearly with time; further, the apparent roughness of the film surface, taken from the standard deviation in film thickness measured at 10 predetermined spots on the surface, was observed to remain constant, or even decrease, with time. Taken together, these data suggest top-down surface erosion of the films; one would anticipate that patchy or bulk degradation would result in a much larger standard deviation and nonlinear degradation behavior. Recent AFM investigations also provide further physical support to the mechanism of top-down degradation (Vazquez, et al. (2002) *J Am Chem Soc* 124, 13992-13993; Fredin, et al. (2005) *Langmuir* 21, 5803-5811). Given the linear degradation and surface erosion observed in both sets of thin films, and without being bound by any particular theory, the vastly different kinetics of degradation and release exhibited by these two systems may reflect differences in film organization, wherein the diffusive character of HEP may contribute to loose gradient films with larger quantities of HEP in the top layers, in comparison to their relatively more stratified, and more densely ion-crosslinked DS counterparts that have a constant distribution of DS throughout the film.

Figure 30:
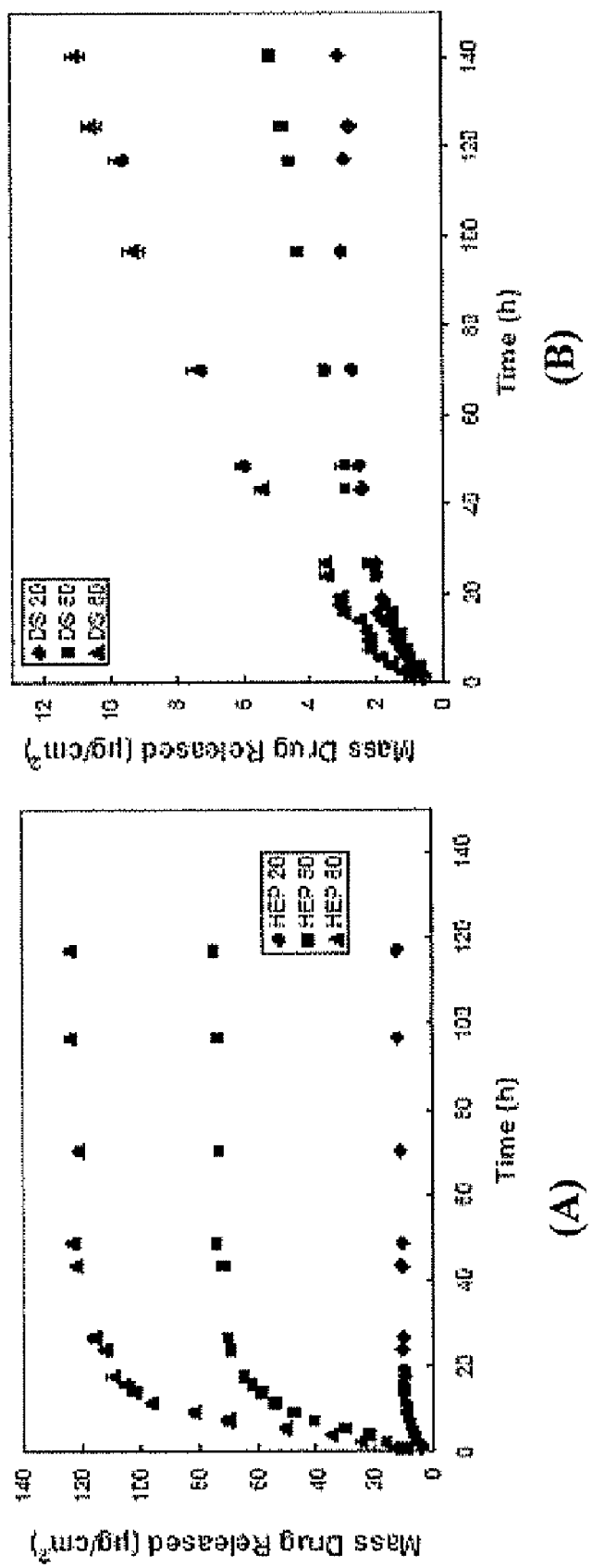
FIG. 30 illustrates release from 20 (diamond), 50 (square), and 80 (triangle) bilayer films according to an exemplary embodiment containing (A) heparin (exponential) and (B) dextran sulfate (linear) with time (surface area normalized; error bars are small)

To further verify that release occurs by means of surface erosion, and to explore the relationship between interlayer diffusion and release properties of degradable LbL constructs, we constructed a series of 20, 50, and 80 bilayer films containing either polymer 1/HEP (FIG. 30A) or polymer 1/DS (FIG. 30B). For the case of polymer 1/HEP systems, the release behavior reflects the expected behavior of an exponentially growing system with top-down degradation behavior. The slope of the release curve differs dramatically between films of varying thickness. Initial release rates of 0.4, 3.7, and 7.9 $\mu g/cm^2 \cdot h$ were observed for 20, 50, and 80 bilayer films, respectively. These data reflect the formation of disorganized films with increasing amounts of the diffusible species (HEP) at each deposition step in exponentially growing systems. Moreover, each HEP-based system was observed to release its contents rapidly (in less than 20 h) without regard to its thickness, again indicating, without being bound by any particular theory, that the majority of the model polyelectrolyte is contained in the upper layers following multiple deposition cycles (Decher, 1997). In sharp contrast, release from (polymer 1/DS) films of increasing thickness resulted in all cases in an initial phase of linear release followed by a "leveling off" as degradation was completed. Interestingly, as might be expected for the case of top-down release from a series of linearly growing films, we observed that all three films released DS at a relatively equivalent rate during the linear release phase (release rates of 0.07, 0.06, and 0.08 $\mu g/cm^2 \cdot h$ were observed for 20, 50, and 80 bilayer films, respectively), and that the duration of this linear release phase was proportional to the number of deposited bilayers (20 h, 49 h, and 97 h for 20, 50, and 80 bilayer films, respectively). Without being bound by any particular theory, the slow release kinetics of these systems may reflect the higher effective ionic crosslink density of the thin films and much lower interlayer diffusivity of the model polyelectrolyte within the multilayer matrix. Importantly, these data suggest that the duration of time over which release occurs can be broadly tuned in linearly growing (non-diffusing) systems simply by changing the number of deposited layers.

Other Embodiments

Those of ordinary skill in the art will appreciate that the foregoing has been a description of certain preferred embodiments of the present invention. This description is not intended to limit the spirit or scope of the present invention, as embodied in the following claims.

What is claimed is:

1. A method of encapsulating an entity comprising a step of:
associating or mixing the entity within a decomposable film comprising a plurality of polyelectrolyte layers of alternating first and second charge, wherein decomposition of the film is characterized by sequential removal of at least a portion of the polyelectrolyte layers by alternating delamination of polyelectrolyte layers having the first charge and degradation of polyelectrolyte layers having the second charge.

2. The method of claim 1, wherein:
the decomposable film comprises alternating polycationic and polyanionic layers, and decomposition of the film is characterized by hydrolytic degradation of a member of the polycationic layers, the polyanionic layers, and both.

3. The method of claim 1, wherein a portion of the polyelectrolyte layers comprises a member of a synthetic polyelectrolyte, a natural polyelectrolyte, or both.

4. The method of claim 1, wherein at least a portion of the polyelectrolyte layers comprises a polymer selected from the group consisting of polyesters, polyanhydrides, polyorthoesters, polyphosphazenes, polyphosphoesters, and any combination thereof.

5. The method of claim 4, wherein the polyesters are selected from the group consisting of poly(β-amino ester)s, poly(L-lactide-co-L-lysine), poly(serine ester), poly(4-hydroxy-L-proline ester), poly[α-(4-aminobutyl)-L-glycolic acid], and any combination thereof.

6. The method of claim 5, wherein the poly(β-amino ester) is

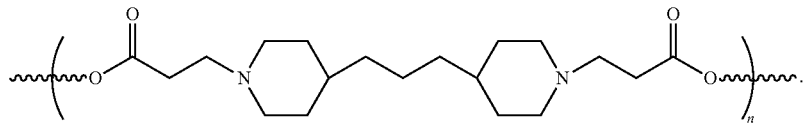

7. The method of claim 1, wherein the degradation is characterized by at least one of hydrolytic, thermal, enzymatic, and photolytic.

8. The method of claim 1, wherein a rate of the degradation of the polyelectrolyte layers varies such that the decomposition rate of the film is not a constant.

9. The method of claim 1, further comprising a step of disposing a layer of cells on a surface of the decomposable film.

10. The method of claim 9, wherein the cells are selected from the group consisting of connective tissue cells, organ cells, muscle cells, nerve cells, stem cells, cancer cells, and any combination thereof.

11. The method of claim 1, wherein at least a portion of the layers comprise an entity selected from the group consisting of a biomolecule, a small molecule, a bioactive agent, and any combination thereof.

12. The method of claim 11, wherein a second portion of the layers comprise a second entity selected from the group consisting of a biomolecule, a small molecule, a bioactive agent, and any combination thereof.

13. The method of claim 11, wherein the concentration of the entity in the decomposable film varies with depth.

14. The method of claim 11, wherein the small molecule is a drug.

15. The method of claim 11, wherein the entity is associated with a polyelectrolyte in a layer of the decomposable film.

16. The method of claim 15, wherein the entity is associated via an interaction selected from covalent bond, a hydrogen bond, an electrostatic interaction, a van der Waals interaction, a hydrophobic interaction, a magnetic interaction and any combination of the above.

17. The method of claim 1, further comprising a step of disposing a member of a cell adhesion sequence, a targeting sequence, and both in a top layer of the decomposable film.

18. The method of claim 1, wherein the decomposable film is deposited on a non-planar substrate.

19. The method of claim 18, wherein the substrate has a shape selected from the group consisting of particles, tube, sphere, strand, coiled strand, and capillary network.

20. The method of claim 18, wherein the degradation of the decomposable film enables dissolution of the substrate material.

21. The method of claim 18, wherein the substrate material diffuses through the decomposable film when combination of the decomposable film and the substrate is placed in a preselected medium.

22. The method of claim 18, wherein the substrate comprises a drug.

23. The method of claim 1, wherein the decomposable film is adapted and constructed as a hollow shell.

24. The method of claim 1, wherein the decomposable film is disposed on a substrate, wherein surface properties of the substrate vary across a surface of the substrate.

25. The method of claim 24, wherein a primer layer is interposed between the decomposable film and the substrate, wherein the primer layer comprises a polyelectrolyte bilayer.

26. The method of claim 25, wherein the polyelectrolyte bilayer comprises a polymer selected from poly(styrene sulfonate) and poly(acrylic acid) and a polymer selected from linear poly(ethylene imine), poly(diallyl dimethyl ammonium chloride), and poly(allylamine hydrochloride).

27. The method of claim 1, wherein the decomposable film is disposed on a substrate comprising a material selected from the group consisting of metals, metal oxides, plastics, ceramics, silicon, glasses, mica, graphite, hydrogels, polymers, and any combination thereof.

* * * * *

UNITED STATES PATENT AND TRADEMARK OFFICE
CERTIFICATE OF CORRECTION

PATENT NO. : 8,105,652 B2  
APPLICATION NO. : 11/459979  
DATED : January 31, 2012  
INVENTOR(S) : Kris C. Wood Page 1 of 1

It is certified that error appears in the above-identified patent and that said Letters Patent is hereby corrected as shown below:

In the Specifications:

Please delete the paragraph titled 'GOVERNMENT FUNDING' encompassing column 1, lines 14-19:

"The work described herein was supported, in part, by grants from the National Institutes of Health (GM26698; NRSA Fellowship # 1 F32 GM20227-01), Division of Materials Research of the National Science Foundation (DMR 9903380), and the Office of Naval Research. Accordingly, the Government may have certain rights in this invention."

and replace with;

--This invention was made with government support under Grant No. DMR0413524 awarded by the National Science Foundation. The government has certain rights in this invention.--

Signed and Sealed this
Fourth Day of December, 2012

David J. Kappos
*Director of the United States Patent and Trademark Office*